(12) United States Patent
Wang et al.

(10) Patent No.: US 12,328,350 B2
(45) Date of Patent: Jun. 10, 2025

(54) METHOD AND APPARATUS FOR FLOOR CONTROL OF INTRA-GROUP POINT-TO-MULTIPOINT COMMUNICATION SERVICE, AND MEDIUM

(71) Applicant: DATANG MOBILE COMMUNICATIONS EQUIPMENT CO., LTD., Beijing (CN)

(72) Inventors: Hucheng Wang, Beijing (CN); Xianfeng Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/550,115

(22) PCT Filed: Jan. 26, 2022

(86) PCT No.: PCT/CN2022/074073
§ 371 (c)(1),
(2) Date: Sep. 11, 2023

(87) PCT Pub. No.: WO2022/188570
PCT Pub. Date: Sep. 15, 2022

(65) Prior Publication Data
US 2024/0163320 A1 May 16, 2024

(30) Foreign Application Priority Data
Mar. 10, 2021 (CN) .......................... 202110262240.9

(51) Int. Cl.
*H04L 65/4038* (2022.01)
*H04L 12/28* (2006.01)
*H04L 12/70* (2013.01)

(52) U.S. Cl.
CPC ...... *H04L 65/4038* (2013.01); *H04L 12/2861* (2013.01); *H04L 2012/5642* (2013.01)

(58) Field of Classification Search
None
See application file for complete search history.

(56) References Cited

U.S. PATENT DOCUMENTS

| 7,970,425 B2 * | 6/2011 | Balachandran | ....... H04W 52/50 |
| | | | 455/518 |
| 8,077,634 B2 * | 12/2011 | Maggenti | .............. H04M 7/006 |
| | | | 370/260 |

(Continued)

FOREIGN PATENT DOCUMENTS

| CN | 1859640 A | 11/2006 |
| CN | 101072390 A | 11/2007 |

(Continued)

OTHER PUBLICATIONS

ISA State Intellectual Property Office of the People's Republic of China, International Search Report and Written Opinion issued in Application No. PCT/CN2022/074073, Apr. 15, 2022, WIPO, 15 pages.

(Continued)

*Primary Examiner* — Ranodhi Serrao
(74) *Attorney, Agent, or Firm* — Kilpatrick Townsend & Stockton LLP

(57) ABSTRACT

The present application provides a method and an apparatus for floor control of an intra-group point-to-multipoint communication service, and a medium. The method includes: receiving a group call request sent by a first group terminal device in a target group, where the group call request includes identification information of the target group; determining, according to the identification information of the target group and a mapping relationship established in advance between identification information of each group (Continued)

and identification information of a terminal device with a control right, a terminal device with the control right corresponding to the target group; sending identification information of the terminal device with the control right to other group terminal devices in the target group; sending the identification information of the target group and a control right role indication to the terminal device with the control right.

7 Claims, 16 Drawing Sheets

(56) References Cited

U.S. PATENT DOCUMENTS

| | | | |
|---|---|---|---|
| 9,143,484 B2* | 9/2015 | Maggenti | H04L 65/4061 |
| 9,320,061 B2* | 4/2016 | Li | H04L 67/62 |
| 10,129,712 B2* | 11/2018 | Dong | H04W 4/10 |
| 11,917,498 B2* | 2/2024 | Ge | H04W 36/0007 |
| 2006/0294243 A1* | 12/2006 | Kuure | H04L 63/104 |
| | | | 709/227 |
| 2007/0049314 A1* | 3/2007 | Balachandran | H04W 4/10 |
| | | | 455/518 |
| 2008/0285532 A1 | 11/2008 | Gentric | |
| 2010/0233993 A1* | 9/2010 | Maggenti | H04L 65/1046 |
| | | | 455/406 |
| 2011/0294469 A1* | 12/2011 | Vaananen | H04M 1/2757 |
| | | | 455/412.1 |
| 2012/0009915 A1 | 1/2012 | Goel et al. | |
| 2014/0355508 A1* | 12/2014 | Anchan | H04W 4/08 |
| | | | 370/312 |
| 2015/0087298 A1* | 3/2015 | Li | H04W 76/40 |
| | | | 455/426.1 |
| 2015/0229677 A1* | 8/2015 | Gu | H04L 65/80 |
| | | | 709/219 |
| 2015/0350098 A1* | 12/2015 | Du | H04W 4/06 |
| | | | 370/328 |
| 2018/0213369 A1* | 7/2018 | Dong | H04L 65/61 |
| 2021/0176284 A1* | 6/2021 | Gu | H04L 65/80 |

FOREIGN PATENT DOCUMENTS

| | | | | |
|---|---|---|---|---|
| CN | 102469416 A | 5/2012 | | |
| CN | 106162573 A | 11/2016 | | |
| CN | 109600719 A | 4/2019 | | |
| CN | 110337072 A | 10/2019 | | |
| CN | 111010744 A | 4/2020 | | |
| EP | 1622406 A1 | 2/2006 | | |
| EP | 3846505 A1 * | 7/2021 | | H04L 47/78 |
| WO | 2020002761 A1 | 1/2020 | | |

OTHER PUBLICATIONS

State Intellectual Property Office of the People's Republic of China, first office action issued in Application No. 202110262240.9, Feb. 25, 2023, 8 pages.
State Intellectual Property Office of the People's Republic of China, notification of Grant of Patent Rights for invention application issued in Application No. 202110262240.9, Aug. 31, 2023, 3 pages.
Ericsson, "Allowing any UE to request the Controller UE to initiate media flow transfer and/or Collaborative Session Control transfer", 3GPP TSG SA WG2 Meeting #72, Mar. 30-Apr. 3, 2009, Hangzhou, China, total 14 pages, TD S2-092246.
European Patent Office, Extended European Search Report Issued in Application No. 22766097.4, Jun. 14, 2024, Germany, 6 pages.

* cited by examiner

METHOD AND APPARATUS FOR FLOOR CONTROL OF INTRA-GROUP POINT-TO-MULTIPOINT COMMUNICATION SERVICE, AND MEDIUM

CROSS-REFERENCE TO RELATED APPLICATIONS

This application is a National Stage of International Application No. PCT/CN2022/074073, filed on Jan. 26, 2022, which claims the priority to Chinese patent application No. 202110262240.9 entitled "METHOD AND APPARATUS FOR FLOOR CONTROL OF INTRA-GROUP POINT-TO-MULTIPOINT COMMUNICATION SERVICE, AND MEDIUM" and filed with the China National Intellectual Property Administration on Mar. 10, 2021. The entire contents of the above applications are incorporated into this application by reference in their entireties.

FIELD

The present application relates to the field of communication technologies, and in particular, to a method and an apparatus for floor control of an intra-group point-to-multipoint communication service, and a medium.

BACKGROUND

With the development of communication technologies, an intra-group point-to-multipoint communication service (T2mT for short) has also achieved rapid development. In order to ensure a smooth progress of the intra-group point-to-multipoint communication service, it is necessary to control the floor of a terminal device in the group.

In the prior art, there are a method for floor control in an on-network functional model and a method for floor control in an off-network functional model. In the method for floor control in an on-network functional model, a floor control server uniformly controls the floor of terminal devices in each group. In the method for floor control in an off-network functional model, all terminal devices in the group can play the role of floor control.

Therefore, the methods for floor control in the prior art cause a heavy burden on a floor control server, or that the floor cannot be centrally controlled in each group, resulting in unreasonable floor control. In addition, if a space-ground integrated network architecture is used for the intra-group point-to-multipoint communication service, when the on-network functional model is used for the floor control, the time delay of the floor control will be relatively large.

SUMMARY

The present application provides a method and an apparatus for floor control of an intra-group point-to-multipoint communication service, and a medium, and solves the problem in prior art that the methods for floor control in the prior art cause a heavy burden on a floor control server, or the floor cannot be centrally controlled in each group, resulting in unreasonable floor control, and if a space-ground integrated network architecture is used for the intra-group point-to-multipoint communication service, when the on-network functional model is used for the floor control, the time delay of the floor control will be relatively large.

In one embodiment of the present application provides a method for floor control of an intra-group point-to-multipoint communication service, applied to a service center, including:

receiving a group call request sent by a first group terminal device in a target group, where the group call request includes identification information of the target group;

determining, according to the identification information of the target group and a mapping relationship established in advance between identification information of each group and identification information of a terminal device with a control right, a terminal device with the control right corresponding to the target group;

sending identification information of the terminal device with the control right to other group terminal devices in the target group, to make the other group terminal devices request floor from the terminal device with the control right;

sending the identification information of the target group and a control right role indication to the terminal device with the control right, to make the terminal device with the control right perform a floor control operation on a group terminal device in the corresponding target group.

In one embodiment, before the determining, according to the identification information of the target group and the mapping relationship established in advance between identification information of each group and the identification information of the terminal device with the control right, the terminal device with the control right corresponding to the target group, the method further includes:

setting, according to a service policy, a terminal device with the control right for each group;

establishing the mapping relationship between the identification information of each group and the identification information of the corresponding terminal device with the control right.

In one embodiment, the terminal device with the control right corresponding to the target group is the first group terminal device;

the sending the identification information of the terminal device with the control right to the other group terminal devices in the target group, to make the other group terminal devices request the floor from the terminal device with the control right includes:

sending a group call request to a second group terminal device in the target group, where the group call request includes identification information of the first group terminal device, to make the second group terminal device request the floor from the first group terminal device, where the second group terminal device is a terminal device in the target group other than the first group terminal device;

the sending the identification information of the target group and the control right role indication to the terminal device with the control right, to make the terminal device with the control right perform the floor control operation on the group terminal device in the corresponding target group includes:

sending a group call response to the first group terminal device, where the group call response includes the identification information of the target group and the control right role indication, to make the first group terminal device perform the floor control operation on the group terminal device in the corresponding target group.

In the embodiment of the present application, when the terminal device with the control right is the first group terminal device in the target group, and the first group terminal device initiates a group call request, through the group call establishment procedure, the service center can send the identification information of the terminal device with the control right to the group terminal device in the target group, and send the identification information of the target group and the control right role indication to the terminal device with the control right, which can not only perform the floor control more reasonably, reduce the time delay of floor control effectively, improve the efficiency of floor control effectively, but also can make full use of the resources in the group call establishment procedure, satisfying the floor control in the scenario where the terminal device with the control right is the first group terminal device in the target group and the first group terminal device initiates the group call request.

In one embodiment, the terminal device with the control right corresponding to the target group is a third group terminal device in the target group;
the sending the identification information of the terminal device with the control right to the other group terminal devices in the target group, to make the other group terminal devices request the floor from the terminal device with the control right includes:
sending a group call request to a second group terminal device in the target group except the third group terminal device, where the group call request includes identification information of the third group terminal device, to make the second group terminal device other than the third group terminal device request the floor from the third group terminal device, where the second group terminal device is a terminal device in the target group other than the first group terminal device;
sending a group call response to the first group terminal device, where the group call response includes the identification information of the third group terminal device, to make the first group terminal device request the floor from the third group terminal device;
the sending the identification information of the target group and the control right role indication to the terminal device with the control right, to make the terminal device with the control right perform the floor control operation on the group terminal device in the corresponding target group includes:
sending a group call request to the third group terminal device, where the group call request includes the identification information of the target group and the control right role indication, to make the third group terminal device perform the floor control operation on the group terminal device in the corresponding target group.

In the embodiment of the present application, when the terminal device with the control right is the third group terminal device in the target group, and the first group terminal device initiates a group call request, through the group call establishment procedure, the service center can send the identification information of the terminal device with the control right to the group terminal device in the target group, and send the identification information of the target group and the control right role indication to the terminal device with the control right, which can not only perform the floor control more reasonably, reduce the time delay of floor control effectively, improve the efficiency of floor control effectively, but also can make full use of the resources in the group call establishment procedure, satisfying the floor control in the scenario where the terminal device with the control right is the third group terminal device in the target group and the first group terminal device initiates the group call request.

In one embodiment, the terminal device with the control right corresponding to the target group is a terminal device outside the target group;
the sending the identification information of the terminal device with the control right to the other group terminal devices in the target group, to make the other group terminal devices request the floor from the terminal device with the control right includes:
sending a group call request to a second group terminal device in the target group, where the group call request includes identification information of the terminal device outside the target group, to make the second group terminal device request the floor from the terminal device outside the target group, where the second group terminal device is a terminal device in the target group other than the first group terminal device;
sending a group call response to the first group terminal device, where the group call response includes the identification information of the terminal device outside the target group, to make the first group terminal device request the floor from the terminal device outside the target group;
the sending the identification information of the target group and the control right role indication to the terminal device with the control right, to make the terminal device with the control right perform the floor control operation on the group terminal device in the corresponding target group includes:
sending a floor notification message to the terminal device outside the target group, where the floor notification message includes the identification information of the target group and the control right role indication, to make the terminal device outside the target group perform the floor control operation on the group terminal device in the corresponding target group.

In the embodiment of the present application, when the terminal device with the control right is a terminal device outside the target group, through the group call establishment procedure, the service center can send the identification information of the terminal device with the control right to the group terminal device in the target group, and through the newly-added floor notification message in the group call establishment procedure, send the identification information of the target group and the control right role indication to the terminal device with the control right, which can not only perform the floor control more reasonably, reduce the time delay of floor control effectively, improve the efficiency of floor control effectively, but also can make full use of the resources in the group call establishment procedure, satisfying the floor control in the scenario where the terminal device with the control right is a terminal device outside the target group.

In one embodiment, after the sending the control right role indication to the terminal device with the control right, to make the terminal device with the control right perform the floor control operation, the method further includes:
acquiring an identification information list of a group terminal device currently having the floor;
sending the identification information of the target group and the identification information list of the group terminal device currently having the floor to a session management function network element (SMF), to make the SMF determine a current multicast data forwarding policy corresponding to each group terminal device in the target group according to the identification information of the target group and the identification information list of the group terminal device currently having the floor, and sending the current multicast data forwarding policy to a user plane function network element (UPF) corresponding to the group terminal device.

In one embodiment, the acquiring the identification information list of the group terminal device currently having the floor includes:
receiving the identification information list of the group terminal device currently having the floor sent by the terminal device with the control right.

In the embodiment of the present application, the identification information list of the group terminal device currently having the floor is acquired; the identification information of the target group and the identification information list of the group terminal device currently having the floor are sent to an SMF, to make the SMF determine a current multicast data forwarding policy corresponding to each group terminal device in the target group according to the identification information of the target group and the identification information list of the group terminal device currently having the floor, and the current multicast data forwarding policy is sent to a UPF corresponding to the group terminal device, enabling the SMF to be aware of the identification information list of the group terminal device currently having the floor, and make the UPF update the multicast forwarding policy of each group terminal device according to the identification information list of the group terminal device currently having the floor and thus perform operations on multicast data according to the multicast forwarding policy, effectively preventing the group terminal device not having the floor from sending voice data maliciously, and strengthening the control over sending of the voice data by the group terminal device not currently having the floor.

In one embodiment of the present application provides a method for floor control of an intra-group point-to-multipoint communication service, applied to a terminal device with a control right, including:
receiving identification information of a target group and a control right role indication sent by a service center;
determining itself as a terminal device with a control right in the corresponding target group according to the identification information of the target group and the control right role indication;
performing a floor control operation on a group terminal device in the corresponding target group.

In one embodiment, the terminal device with the control right is a first group terminal device in the corresponding target group;
the receiving the identification information of the target group and the control right role indication sent by the service center includes:
receiving a group call response sent by the service center, where the group call response includes the identification information of the target group and the control right role indication;
or, the terminal device with the control right is a third group terminal device in the corresponding target group, and the third group terminal device is any terminal device of a second group terminal device in the target group other than the first group terminal device;

the receiving the identification information of the target group and the control right role indication sent by the service center includes:
receiving a group call request sent by the service center, where the group call request includes the identification information of the target group and the control right role indication;
or, the terminal device with the control right is a terminal device outside the target group;
the receiving the identification information of the target group and the control right role indication sent by the service center includes:
receiving a floor notification message sent by the service center, where the floor notification message includes the identification information of the target group and the control right role indication.

In one embodiment, the performing the floor control operation on the group terminal device in the corresponding target group includes:
determining whether a floor request sent by a certain group terminal device in the corresponding target group is received;
if it is determined that the floor request sent by the certain group terminal device is received, determining whether to grant the floor to the group terminal device according to the floor request;
if it is determined that the group terminal device is granted the floor, sending a floor granted message to the group terminal device and sending a floor taken message to other group terminal devices in the target group except the group terminal device.

In one embodiment, after the performing the floor control operation on the group terminal device in the corresponding target group, the method further includes:
determining an identification information list of a group terminal device currently having the floor;
sending the identification information of the target group and the identification information list of the group terminal device currently having the floor to the service center or an SMF.

In one embodiment, the sending the identification information of the target group and the identification information list of the group terminal device currently having the floor to the SMF includes:
sending a protocol data unit (PDU) session modification request to the SMF, where the PDU session modification request includes the identification information of the target group and the identification information list of the group terminal device currently having the floor.

In one embodiment of the present application provides a method for floor control of an intra-group point-to-multipoint communication service, applied to an SMF, including:
acquiring identification information of a target group and identification information list of a group terminal device currently having the floor, where the identification information list of the group terminal device currently having the floor is determined by a service center, or the identification information list of the group terminal device currently having the floor is determined by a terminal device with a control right corresponding to the target group, after the terminal device with the control right corresponding to the target group determines, according to the identification information of the target group and a control right role indication, itself as the terminal device with the control right in the corresponding target group to perform a floor control operation on a group terminal device in the target group; where the control right role indication is sent by the service center to the terminal device with the control right;

determining a current multicast data forwarding policy corresponding to each group terminal device in the target group according to the identification information of the target group and the identification information list of the group terminal device currently having the floor;

sending the current multicast data forwarding policy to a UPF corresponding to the group terminal device, to make the UPF, after receiving multicast data sent by the corresponding group terminal device, perform forwarding or discarding operation on the multicast data according to the corresponding current multicast data forwarding policy.

In one embodiment, the acquiring the identification information of the target group and the identification information list of the group terminal device currently having the floor includes:

receiving the identification information of the target group and the identification information list of the group terminal device currently having the floor sent by the service center or the terminal device with the control right.

In one embodiment, the receiving the identification information of the target group and the identification information list of the group terminal device currently having the floor sent by the terminal device with the control right includes:

receiving a PDU session modification request sent by the terminal device with the control right, where the PDU session modification request includes the identification information of the target group and the identification information list of the group terminal device currently having the floor.

In one embodiment, the determining the current multicast data forwarding policy corresponding to each group terminal device in the target group according to the identification information of the target group and the identification information list of the group terminal device currently having the floor includes:

determining, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device not currently having the floor.

In one embodiment, the sending the current multicast data forwarding policy to the UPF corresponding to the group terminal device includes:

sending an N4 session establishment request and/or modification request to a UPF corresponding to each group terminal device, where the N4 session establishment request and/or modification request includes the corresponding current multicast data forwarding policy.

In one embodiment of the present application provides an apparatus for floor control of an intra-group point-to-multipoint communication service, located in a service center, including a memory, a transceiver, and a processor:

where the memory is configured to store a computer program; the transceiver is configured to send and receive data under control of the processor; and the processor is configured to read the computer program in the memory and execute following operations:

receiving a group call request sent by a first group terminal device in a target group, where the group call request includes identification information of the target group;

determining, according to the identification information of the target group and a mapping relationship established in advance between identification information of each group and identification information of a terminal device with a control right, a terminal device with the control right corresponding to the target group;

sending identification information of the terminal device with the control right to other group terminal devices in the target group, to make the other group terminal devices request floor from the terminal device with the control right;

sending the identification information of the target group and a control right role indication to the terminal device with the control right, to make the terminal device with the control right perform a floor control operation on a group terminal device in the corresponding target group.

In one embodiment, before the processor is configured to determine, according to the identification information of the target group and the mapping relationship established in advance between the identification information of each group and the identification information of the terminal device with the control right, the terminal device with the control right corresponding to the target group, the operations further include:

setting, according to a service policy, a terminal device with the control right for each group;

establishing the mapping relationship between the identification information of each group and the identification information of the corresponding terminal device with the control right.

In one embodiment, the terminal device with the control right corresponding to the target group is the first group terminal device;

when the processor is configured to send the identification information of the terminal device with the control right to the other group terminal devices in the target group, to make the other group terminal devices request the floor from the terminal device with the control right, the operations include:

sending a group call request to a second group terminal device in the target group, where the group call request includes identification information of the first group terminal device, to make the second group terminal device request the floor from the first group terminal device, where the second group terminal device is a terminal device in the target group other than the first group terminal device;

when the processor is configured to send the identification information of the target group and the control right role indication to the terminal device with the control right, to make the terminal device with the control right perform the floor control operation on the group terminal device in the corresponding target group, the operations include:

sending a group call response to the first group terminal device, where the group call response includes the identification information of the target group and the control right role indication, to make the first group terminal device perform the floor control operation on the group terminal device in the corresponding target group.

In one embodiment, the terminal device with the control right corresponding to the target group is a third group terminal device in the target group;
  when the processor is configured to send the identification information of the terminal device with the control right to the other group terminal devices in the target group, to make the other group terminal devices request the floor from the terminal device with the control right, the operations include:
    sending a group call request to a second group terminal device in the target group except the third group terminal device, where the group call request includes identification information of the third group terminal device, to make the second group terminal device other than the third group terminal device request the floor from the third group terminal device, where the second group terminal device is a terminal device in the target group other than the first group terminal device;
    sending a group call response to the first group terminal device, where the group call response includes the identification information of the third group terminal device, to make the first group terminal device request the floor from the third group terminal device;
  when the processor is configured to send the identification information of the target group and the control right role indication to the terminal device with the control right, to make the terminal device with the control right perform the floor control operation on the group terminal device in the corresponding target group, the operations include:
    sending a group call request to the third group terminal device, where the group call request includes the identification information of the target group and the control right role indication, to make the third group terminal device perform the floor control operation on the group terminal device in the corresponding target group.

In one embodiment, the terminal device with the control right corresponding to the target group is a terminal device outside the target group;
  when the processor is configured to send the identification information of the terminal device with the control right to the other group terminal devices in the target group, to make the other group terminal devices request the floor from the terminal device with the control right, the operations include:
    sending a group call request to a second group terminal device in the target group, where the group call request includes identification information of the terminal device outside the target group, to make the second group terminal device request the floor from the terminal device outside the target group, where the second group terminal device is a terminal device in the target group other than the first group terminal device; sending a group call response to the first group terminal device, where the group call response includes the identification information of the terminal device outside the target group, to make the first group terminal device request the floor from the terminal device outside the target group;
  when the processor is configured to send the identification information of the target group and the control right role indication to the terminal device with the control right, to make the terminal device with the control right perform the floor control operation on the group terminal device in the corresponding target group, the operations include:
    sending a floor notification message to the terminal device outside the target group, where the floor notification message includes the identification information of the target group and the control right role indication, to make the terminal device outside the target group perform the floor control operation on the group terminal device in the corresponding target group.

In one embodiment, after the processor is configured to send the control right role indication to the terminal device with the control right, to make the terminal device with the control right perform the floor control operation, the operations further includes:
  acquiring an identification information list of a group terminal device currently having the floor;
  sending the identification information of the target group and the identification information list of the group terminal device currently having the floor to an SMF, to make the SMF determine a current multicast data forwarding policy corresponding to each group terminal device in the target group according to the identification information of the target group and the identification information list of the group terminal device currently having the floor, and sending the current multicast data forwarding policy to a UPF corresponding to the group terminal device.

In one embodiment, when the processor is configured to acquire the identification information list of the group terminal device currently having the floor, the operations include:
  receiving the identification information list of the group terminal device currently having the floor sent by the terminal device with the control right.

In one embodiment of the present application provides an apparatus for floor control of an intra-group point-to-multipoint communication service, located in a terminal device with a control right, including a memory, a transceiver, and a processor:
  where the memory is configured to store a computer program; the transceiver is configured to send and receive data under control of the processor; and the processor is configured to read the computer program in the memory and execute following operations:
  receiving identification information of a target group and a control right role indication sent by a service center;
  determining itself as a terminal device with a control right in the corresponding target group according to the identification information of the target group and the control right role indication;
  performing a floor control operation on a group terminal device in the corresponding target group.

In one embodiment, the terminal device with the control right is a first group terminal device in the corresponding target group;
  when the processor is configured to receive the identification information of the target group and the control right role indication sent by the service center, the operations include:
    receiving a group call response sent by the service center, where the group call response includes the identification information of the target group and the control right role indication;

or, the terminal device with the control right is a third group terminal device in the corresponding target group, and the third group terminal device is any terminal device of a second group terminal device in the target group other than the first group terminal device;

when the processor is configured to receive the identification information of the target group and the control right role indication sent by the service center, the operations include:

receiving a group call request sent by the service center, where the group call request includes the identification information of the target group and the control right role indication;

or, the terminal device with the control right is a terminal device outside the target group;

when the processor is configured to receive the identification information of the target group and the control right role indication sent by the service center, the operations include:

receiving a floor notification message sent by the service center, where the floor notification message includes the identification information of the target group and the control right role indication.

In one embodiment, when the processor performs the floor control operation on the group terminal device in the corresponding target group, the operations include:

determining whether a floor request sent by a certain group terminal device in the corresponding target group is received;

if it is determined that the floor request sent by the certain group terminal device is received, determining whether to grant the floor to the group terminal device according to the floor request;

if it is determined that the group terminal device is granted the floor, sending a floor granted message to the group terminal device and sending a floor taken message to other group terminal devices in the target group except the group terminal.

In one embodiment, after the processor performs the floor control operation on the group terminal device in the corresponding target group, the operations further include:

determining an identification information list of a group terminal device currently having the floor;

sending the identification information of the target group and the identification information list of the group terminal device currently having the floor to the service center or an SMF.

In one embodiment, when the processor sends the identification information of the target group and the identification information list of the group terminal device currently having the floor to the SMF, the operations include:

sending a PDU session modification request to the SMF, where the PDU session modification request includes the identification information of the target group and the identification information list of the group terminal device currently having the floor.

In one embodiment of the present application provides an apparatus for floor control of an intra-group point-to-multipoint communication service, located in an SMF, including a memory, a transceiver, and a processor:

where the memory is configured to store a computer program; the transceiver is configured to send and receive data under control of the processor; and the processor is configured to read the computer program in the memory and execute following operations:

acquiring identification information of a target group and identification information list of a group terminal device currently having the floor, where the identification information list of the group terminal device currently having the floor is determined by a service center, or the identification information list of the group terminal device currently having the floor is determined by a terminal device with a control right corresponding to the target group, after the terminal device with the control right corresponding to the target group determines, according to the identification information of the target group and a control right role indication, itself as the terminal device with the control right in the corresponding target group to perform a floor control operation on a group terminal device in the target group; where the control right role indication is sent by the service center to the terminal device with the control right;

determining a current multicast data forwarding policy corresponding to each group terminal device in the target group according to the identification information of the target group and the identification information list of the group terminal device currently having the floor;

sending the current multicast data forwarding policy to a UPF corresponding to the group terminal device, to make the UPF, after receiving multicast data sent by the corresponding group terminal device, perform forwarding or discarding operation on the multicast data according to the corresponding current multicast data forwarding policy.

In one embodiment, when the processor is configured to acquire the identification information of the target group and the identification information list of the group terminal device currently having the floor, the operations include:

receiving the identification information of the target group and the identification information list of the group terminal device currently having the floor sent by the service center or the terminal device with the control right.

In one embodiment, when the processor receives the identification information of the target group and the identification information list of the group terminal device currently having the floor sent by the terminal device with the control right, the operations include:

receiving a PDU session modification request sent by the terminal device with the control right, where the PDU session modification request includes the identification information of the target group and the identification information list of the group terminal device currently having the floor.

In one embodiment, when the processor determines the current multicast data forwarding policy corresponding to each group terminal device in the target group according to the identification information of the target group and the identification information list of the group terminal device currently having the floor, the operations include:

determining, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device not currently having the floor.

In one embodiment, the processor sends the current multicast data forwarding policy to the UPF corresponding to the group terminal device, the operations include:

sending an N4 session establishment request and/or modification request to a UPF corresponding to each group terminal device, where the N4 session establishment request and/or modification request includes the corresponding current multicast data forwarding policy.

In one embodiment of the present application provides an apparatus for floor control of an intra-group point-to-multipoint communication service, located in a service center, including:

a receiving unit, configured to receive a group call request sent by a first group terminal device in a target group, where the group call request includes identification information of the target group;

a determining unit, configured to determine, according to the identification information of the target group and a mapping relationship established in advance between identification information of each group and identification information of a terminal device with a control right, a terminal device with the control right corresponding to the target group;

a sending unit, configured to send identification information of the terminal device with the control right to other group terminal devices in the target group, to make the other group terminal devices request floor from the terminal device with the control right;

where the sending unit is further configured to send the identification information of the target group and a control right role indication to the terminal device with the control right, to make the terminal device with the control right perform a floor control operation on a group terminal device in the corresponding target group.

In one embodiment, the apparatus further includes: an establishing unit, configured to, before the determining unit determines, according to the identification information of the target group and the mapping relationship established in advance between the identification information of each group and the identification information of the terminal device with the control right, the terminal device with the control right corresponding to the target group, set, according to a service policy, a terminal device with the control right for each group; establish the mapping relationship between the identification information of each group and the identification information of the corresponding terminal device with the control right.

In one embodiment, the terminal device with the control right corresponding to the target group is the first group terminal device; the sending unit, when sending the identification information of the terminal device with the control right to the other group terminal devices in the target group, to make the other group terminal devices request the floor from the terminal device with the control right, is configured to: send a group call request to a second group terminal device in the target group, where the group call request includes identification information of the first group terminal device, to make the second group terminal device request the floor from the first group terminal device, where the second group terminal device is a terminal device in the target group other than the first group terminal device; the sending unit, when sending the identification information of the target group and the control right role indication to the terminal device with the control right, to make the terminal device with the control right perform the floor control operation on the group terminal device in the corresponding target group, is configured to: send a group call response to the first group terminal device, where the group call response includes the identification information of the target group and the control right role indication, to make the first group terminal device perform the floor control operation on the group terminal device in the corresponding target group.

In one embodiment, the terminal device with the control right corresponding to the target group is a third group terminal device in the target group; the sending unit, when sending the identification information of the terminal device with the control right to the other group terminal devices in the target group, to make the other group terminal devices request the floor from the terminal device with the control right, is configured to: send a group call request to a second group terminal device in the target group except the third group terminal device, where the group call request includes identification information of the third group terminal device, to make the second group terminal device other than the third group terminal device request the floor from the third group terminal device, where the second group terminal device is a terminal device in the target group other than the first group terminal device; send a group call response to the first group terminal device, where the group call response includes the identification information of the third group terminal device, to make the first group terminal device request the floor from the third group terminal device; the sending unit, when sending the identification information of the target group and the control right role indication to the terminal device with the control right, to make the terminal device with the control right perform the floor control operation on the group terminal device in the corresponding target group, is configured to: send a group call request to the third group terminal device, where the group call request includes the identification information of the target group and the control right role indication, to make the third group terminal device perform the floor control operation on the group terminal device in the corresponding target group.

In one embodiment, the terminal device with the control right corresponding to the target group is a terminal device outside the target group; the sending unit, when sending the identification information of the terminal device with the control right to the other group terminal devices in the target group, to make the other group terminal devices request the floor from the terminal device with the control right, is configured to: send a group call request to a second group terminal device in the target group, where the group call request includes identification information of the terminal device outside the target group, to make the second group terminal device request the floor from the terminal device outside the target group, where the second group terminal device is a terminal device in the target group other than the first group terminal device; send a group call response to the first group terminal device, where the group call response includes the identification information of the terminal device outside the target group, to make the first group terminal device request the floor from the terminal device outside the target group; the sending unit, when sending the identification information of the target group and the control right role indication to the terminal device with the control right, to make the terminal device with the control right perform the floor control operation on the group terminal device in the corresponding target group, is configured to: send a floor notification message to the terminal device outside the target group, where the floor notification message includes the identification information of the target group and the control right role indication, to make the terminal device outside the target group perform the floor control operation on the group terminal device in the corresponding target group.

In one embodiment, the apparatus further includes: an acquiring unit, where the acquiring unit is configured to acquire an identification information list of a group terminal device currently having the floor; the sending unit is configured to send the identification information of the target group and the identification information list of the group terminal device currently having the floor to an SMF, to make the SMF determine a current multicast data forwarding policy corresponding to each group terminal device in the target group according to the identification information of the target group and the identification information list of the group terminal device currently having the floor, and send the current multicast data forwarding policy to a UPF corresponding to the group terminal device.

In one embodiment, the acquiring unit is configured to: receive the identification information list of the group terminal device currently having the floor sent by the terminal device with the control right.

In one embodiment of the present application provides an apparatus for floor control of an intra-group point-to-multipoint communication service, located in a terminal device with a control right, including:
 a receiving unit, configured to receive identification information of a target group and a control right role indication sent by a service center;
 a determining unit, configured to determine, according to the identification information of the target group and the control right role indication, itself as a terminal device with a control right in the corresponding target group;
 a controlling unit, configured to perform a floor control operation on a group terminal device in the corresponding target group.

In one embodiment, the terminal device with the control right is a first group terminal device in the corresponding target group; the receiving unit is configured to: receive a group call response sent by the service center, where the group call response includes the identification information of the target group and the control right role indication. In one embodiment, the terminal device with the control right is a third group terminal device in the corresponding target group, and the third group terminal device is any terminal device of a second group terminal device in the target group other than the first group terminal device, the receiving unit is configured to: receive a group call request sent by the service center, where the group call request includes the identification information of the target group and the control right role indication. In one embodiment, the terminal device with the control right is a terminal device outside the target group, and the receiving unit is configured to: receive a floor notification message sent by the service center, where the floor notification message includes the identification information of the target group and the control right role indication.

In one embodiment, the controlling unit is configured to: determine whether a floor request sent by a certain group terminal device in the corresponding target group is received; if it is determined that the floor request sent by the certain group terminal device is received, determine whether to grant the floor to the group terminal device according to the floor request; if it is determined that the group terminal device is granted the floor, send a floor granted message to the group terminal device and send a floor taken message to other group terminal devices in the target group except the group terminal.

In one embodiment, the apparatus further includes: a sending unit;
 where the determining unit is configured to determine an identification information list of a group terminal device currently having the floor; the sending unit is configured to send the identification information of the target group and the identification information list of the group terminal device currently having the floor to the service center or an SMF.

In one embodiment, the sending unit, when sending the identification information of the target group and the identification information list of the group terminal device currently having the floor to the SMF, is configured to: send a PDU session modification request to the SMF, where the PDU session modification request includes the identification information of the target group and the identification information list of the group terminal device currently having the floor.

In one embodiment of the present application provides an apparatus for floor control of an intra-group point-to-multipoint communication service, located in an SMF, including:
 an acquiring unit, configured to acquire identification information of a target group and an identification information list of a group terminal device currently having the floor, where the identification information list of the group terminal device currently having the floor is determined by a service center, or the identification information list of the group terminal device currently having the floor is determined by a terminal device with a control right corresponding to the target group, after the terminal device with the control right corresponding to the target group determines, according to the identification information of the target group and a control right role indication, itself as the terminal device with the control right in the corresponding target group to perform a floor control operation on a group terminal device in the target group; where the control right role indication is sent by the service center to the terminal device with the control right;
 a determining unit, configured to determine a current multicast data forwarding policy corresponding to each group terminal device in the target group according to the identification information of the target group and the identification information list of the group terminal device currently having the floor;
 a sending unit, configured to send the current multicast data forwarding policy to a UPF corresponding to the group terminal device, to make the UPF, after receiving multicast data sent by the corresponding group terminal device, perform forwarding or discarding operation on the multicast data according to the current multicast data forwarding policy.

In one embodiment, the acquiring unit is configured to: receive the identification information of the target group and the identification information list of the group terminal device currently having the floor sent by the service center or the terminal device with the control right.

In one embodiment, the acquiring unit, when receiving the identification information of the target group and the identification information list of the group terminal device currently having the floor sent by the terminal device with the control right, is configured to: receive a PDU session modification request sent by the terminal device with the control right, where the PDU session modification request includes the identification information of the target group and the identification information list of the group terminal device currently having the floor.

In one embodiment, the determining unit is configured to: determine, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device not currently having the floor.

In one embodiment, the sending unit is configured to: send an N4 session establishment request and/or modification request to a UPF corresponding to each group terminal device, where the N4 session establishment request and/or modification request includes the corresponding current multicast data forwarding policy.

In one embodiment of the present application provides a processor-readable storage medium, where the processor-readable storage medium has a computer program stored thereon, and the computer program is used to cause the processor to execute the method according to any of the embodiments.

The present application provides a method and an apparatus for floor control of an intra-group point-to-multipoint communication service, and a medium. The method includes receiving a group call request sent by a first group terminal device in a target group, where the group call request includes identification information of the target group; determining, according to the identification information of the target group and a mapping relationship established in advance between identification information of each group and identification information of a terminal device with a control right, a terminal device with the control right corresponding to the target group; sending identification information of the terminal device with the control right to other group terminal devices in the target group, to make the other group terminal devices request floor from the terminal device with the control right; sending the identification information of the target group and a control right role indication to the terminal device with the control right, to make the terminal device with the control right perform a floor control operation on a corresponding group terminal device in the target group. Since the service center configures each group with a corresponding terminal device with the control right in advance, the identification information of the terminal device with the control right is sent to the group terminal device in the target group, to make it clear to the group terminal device in the target group that the group terminal device in the target group requests the floor from the terminal device with the control right, and the identification information of the target group and the control right role indication are sent to the terminal device with the control right, to make it clear to the terminal device with the control right that the terminal device with the control right plays a role of the floor control of the corresponding target group, and the terminal device with the control right controls the floor of the corresponding target group. Therefore, the floor control task of the floor control server is distributed by groups, and the floor can be centrally controlled in each group at the same time, so the floor control can be performed more reasonably. In addition, as the terminal device performs the floor control on terminal devices in the group, in the space-ground integrated network architecture, there is no need for a round trip between the air and the ground for the floor control process, and the time delay of the floor control can be effectively reduced, and the efficiency of floor control can be improved effectively.

It should be understood that what is described in the summary above is not intended to limit key or important features of embodiments of the present disclosure, nor is it intended to limit the scope of the present disclosure. Other features of the present disclosure will be easily understood through the following description.

BRIEF DESCRIPTION OF DRAWINGS

In order to describe the embodiments of the present application or prior art more clearly, in the following, drawings that need to be used in the description of the embodiments or prior art will be introduced briefly. The drawings described below are some embodiments of the present disclosure.

DESCRIPTION OF EMBODIMENTS

The term "plurality of" in the present application refers to two or more than two, and other quantifiers are similar.

In order to clearly understand the embodiment of the present application, a solution in the prior art is first introduced in detail.

In the prior art, methods for floor control of an intra-group point-to-multipoint communication service mainly include a method for floor control in an on-network functional model and a method for floor control in an off-network functional model.

Figure 1:
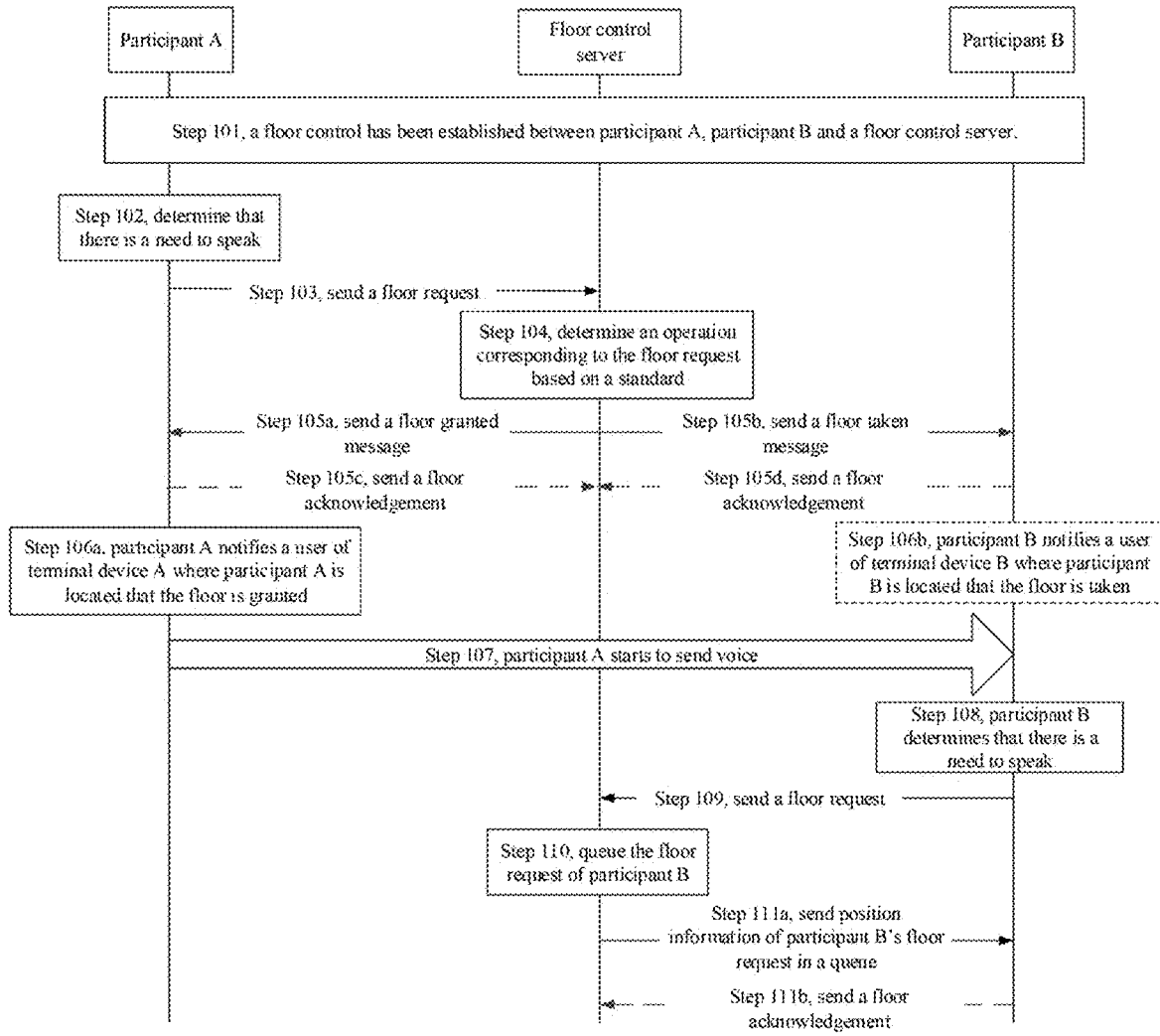
FIG. 1 is a flow chart of signaling interaction of a method for floor control of an MCPTT service in the prior art.

For the method for floor control in an on-network functional model of a mission critical push to talk (MCPTT) service, reference may be made to 3GPP TS23.379 standard. A process of floor request, floor grant, and floor taken is taken as an example for illustration. As shown in FIG. 1, illustratively, a target group includes two terminal devices, which are terminal device A and terminal device B respectively. There is a participant A in the terminal device A, and a participant B in the terminal device B to jointly participate in the MCPTT service. A method for floor control in an on-network functional model of the MCPTT service includes the following steps.

Step 101, floor control has been established between participant A, participant B and a floor control server.

Step 102, participant A determines that there is a need to speak.

Step 103, participant A sends a floor request to the floor control server.

The floor request carries a floor priority and other necessary information.

Step 104, the floor control server determines an operation corresponding to the floor request based on a standard.

Illustratively, the floor control server determines, based on a floor priority and/or participant type of participant A, that an operation of granting, denying, or queueing the floor request is to be performed.

The floor control server can limit a duration of participant A having the floor, through configuration.

Step 105a, the floor control server sends a floor granted message to participant A.

Step 105b, the floor control server sends a floor taken message to another participant.

The floor taken message includes information about who is granted the floor. The other participant in the target group in FIG. 1 is participant B.

Step 105c, participant A sends a floor acknowledgement to the floor control server.

After participant A receives the floor granted message, which indicates that the floor control server instructs that the floor is granted to participant A, so participant A sends a floor acknowledgement to the floor control server.

Step 105d, participant B sends a floor acknowledgement to the floor control server.

After participant B receives the floor taken message, participant B analyzed that the floor taken message includes information about who is granted the floor, which indicates that the floor control server instructs that the floor is granted to participant A, so participant B sends a floor acknowledgement to the floor control server.

Step 106a, participant A notifies the user of terminal device A where participant A is located that the floor is granted.

Step 106b, participant B notifies the user of terminal device B where participant B is located that the floor is taken.

Step 107, participant A starts to send voice.

Step 108, participant B determines that there is a need to speak.

Step 109, participant B sends a floor request to the floor control server.

Step 110, the floor control server queues the floor request of participant B.

Step 111a, the floor control server sends position information of participant B's floor request in a queue to participant B.

Step 111b, participant B sends a floor acknowledgement to the floor control server.

For other floor control processes in the floor control method in the on-network functional model of the MCPTT service, such as floor revocation and floor release, see TS23.379 for details which will not be repeated here. In addition, in the method for floor control, the floor control in other groups is also uniformly performed by the floor control server. Therefore, in the method for floor control in an on-network functional model, the floor control server performs unified and centralized control of the floor of terminal devices in each group. As a result, the floor control server has a heavy burden of floor control.

Figure 2:
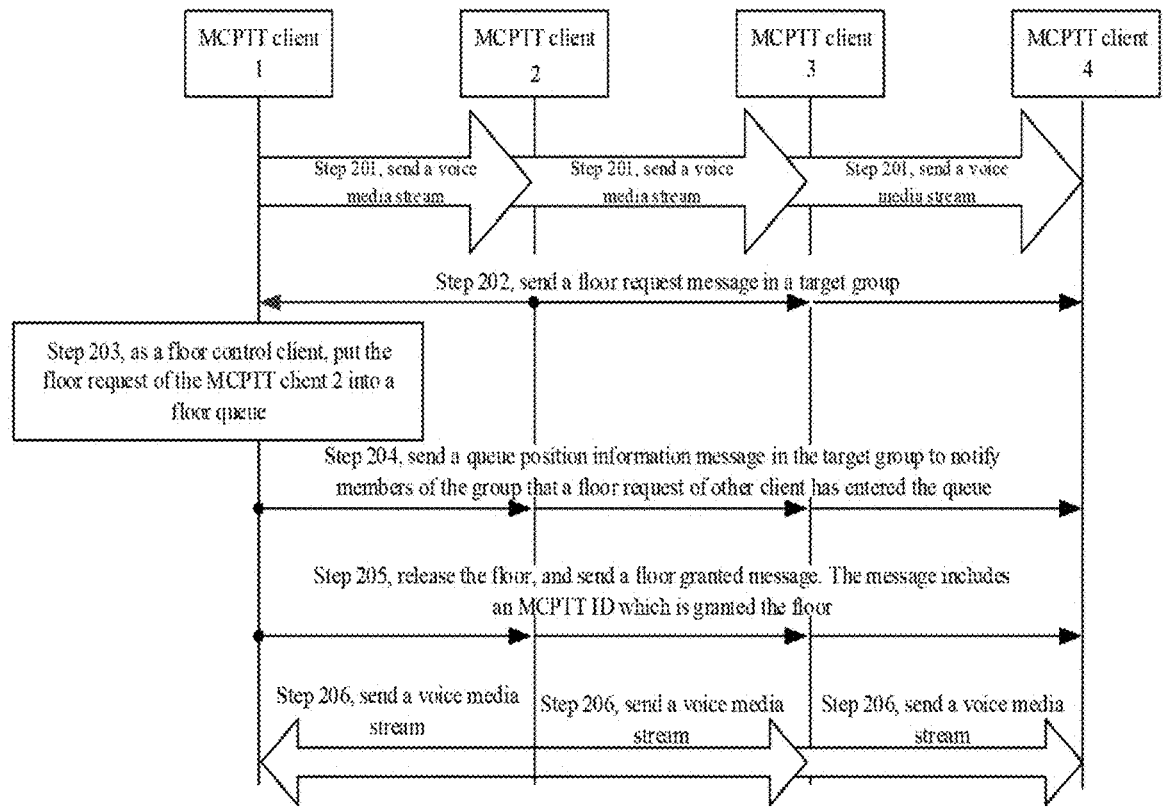
FIG. 2 is another flowchart of signaling interaction of a method for floor control of an MCPTT service in the prior art.

For the method for floor control in the off-network functional model of the MCPTT service, reference can be made to the TS23.379 standard. The process of floor request, floor grant, and floor taken is taken as an example for illustration. As shown in FIG. 2, illustratively, a target group includes four terminal devices, which are terminal device 1, terminal device 2, terminal device 3 and terminal device 4, respectively. The terminal device 1 has an MCPTT client 1, the terminal device 2 has an MCPTT client 2, the terminal device 3 has an MCPTT client 3, and the terminal device 4 has an MCPTT client 4. The four clients jointly participate in the MCPTT service. A method for floor control in an off-network functional model of the MCPTT service includes the following steps.

Step 201, the MCPTT client 1 sends a voice media stream.

Step 202, the MCPTT client 2 sends a floor request message in a target group.

Step 203, the MCPTT client 1, as a floor control client, puts the floor request of the MCPTT client 2 into a floor queue.

Step 204, the MCPTT client 1 sends a queue position information message in the target group to notify members of the group that a floor request of another client has entered the queue.

Illustratively, in the floor queue, the floor request of the MCPTT client 2 has the highest priority.

Step 205, the MCPTT client 1 releases the floor, and sends a floor granted message. The message includes an MCPTT ID which is granted the floor.

If there is a queue list, the queue list may also be included in the floor granted message. Illustratively, if the MCPTT ID which is granted the floor is the ID of the MCPTT client 2, the MCPTT client 1 may also carry a maximum duration of voice media sent by the MCPTT client 2 in the floor granted message.

Step 206, the MCPTT client 2 sends the voice media stream and becomes a new floor control client.

For the details of other floor control processes in the method for floor control in an off-network functional model of the MCPTT service, reference can be made to TS23.379, which will not repeated here. From the method for floor control in an off-network functional mode, it can be seen that the floor control mode is distributed control, and all clients in the target group can play a role of the floor control, so there is a lack of centralized control of the floor.

Therefore, the floor is controlled either too centrally for one of the floor control methods in the prior art or too distributed for the other, resulting in the unreasonable floor control.

Figure 3:
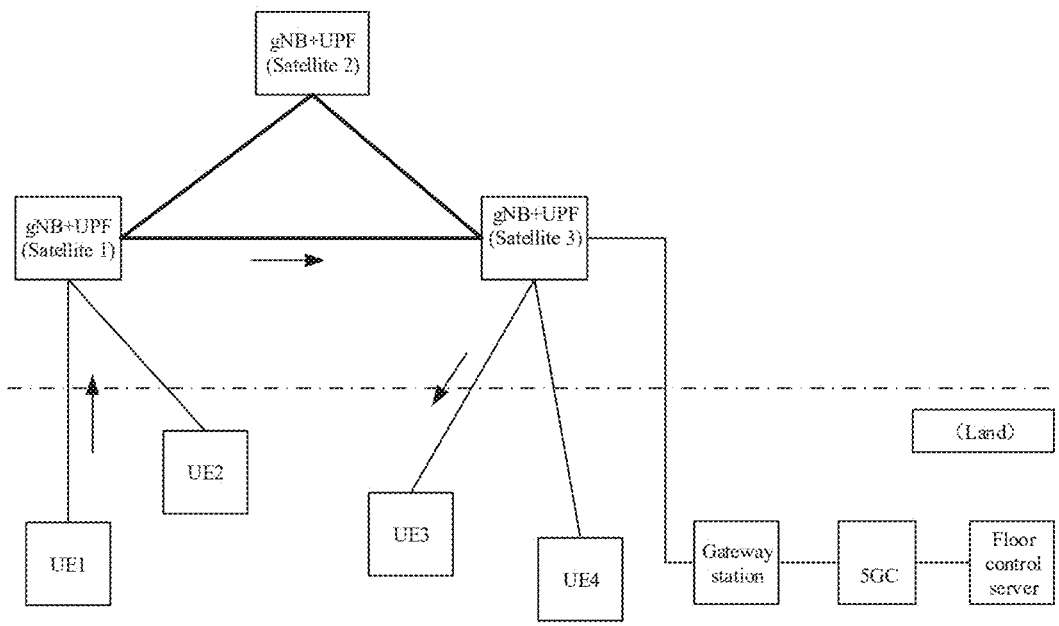
FIG. 3 is a space-ground integrated network architecture diagram of a method for floor control of an intra-group point-to-multipoint communication service in the prior art.

FIG. 3 is a space-ground integrated network architecture diagram of a method for floor control of an intra-group point-to-multipoint communication service in the prior art. As shown in FIG. 3, in the space-ground integrated network architecture, satellite 1, satellite 2 and satellite 3 constitute an inter-satellite transmission tunnel. Each satellite is equipped with a base station (gNB) and a user plane function network element (UPF). Each terminal device communicates with a gateway station deployed on the ground through the inter-satellite transmission tunnel, and then communicates with the floor control server through a 5G core network (5GC). However, the floor control process requires multiple times of interaction between the terminal device and the floor control server. For example, the floor request message requires to be forwarded to the ground gateway through the UPF on the satellite, and then sent to the floor control server. The floor response message is forwarded to the UPF on the satellite through the ground gateway station, and then sent to the terminal device, resulting in a large round trip delay, which in turn leads to a large delay of the floor control.

Based on the problems in the prior art, the inventor found through creative research that the intra-group point-to-multipoint communication service usually has its own service center, and the service center has functions, such as group management and floor control. Therefore, the service center can configure a corresponding device with a control right for each group in advance according to a service policy, that is, construct a mapping relationship between identification information of each group and identification information of the device with the control right. The control right includes floor control. In order to save resources and reduce time delay, the device with the control right can be a terminal device, and can be configured as a terminal device in the group or as a terminal device outside the group according to requirements. After receiving a group call request sent by a certain group terminal device in a target group, the service center determines, according to identification information of the target group included in the group call request and the mapping relationship established in advance between the identification information of each group and the identification information of the terminal device with the control right, a terminal device with the control right corresponding to the target group. The service center sends the identification information of the terminal device with the control right to other group terminal devices in the target group, to make the other group terminal devices determine the corresponding terminal device with the control right and then request the floor from the terminal device with the control right. The service center sends the identification information of the target group and a control right role indication to the terminal device with the control right, to make the terminal device with the control right perform a floor control operation on a group terminal device in the corresponding target group. Since the service center configures each group with a corresponding terminal device with the control right in advance, the identification information of the terminal device with the control right is sent to the group terminal device in the target group, to make it clear to the group terminal device in the target group that the group terminal device in the target group requests the floor from the terminal device with the control right, and the identification information of the target group and the control right role indication are sent to the terminal device with the control right, to make it clear to the terminal device with the control right that the terminal device with the control right plays a role of the floor control of the corresponding target group, and the terminal device with the control right controls the floor of the corresponding target group. Therefore, the floor control task of the floor control server is distributed by groups, and the floor can be centrally controlled in each group at the same time, so the floor control can be performed more reasonably. In addition, as the terminal device performs the floor control on terminal devices in the group, in the space-ground integrated network architecture, there is no need for a round trip between the air and the ground for the floor control process, and the time delay of the floor control can be effectively reduced, and the efficiency of floor control can be improved effectively.

Figure 4:
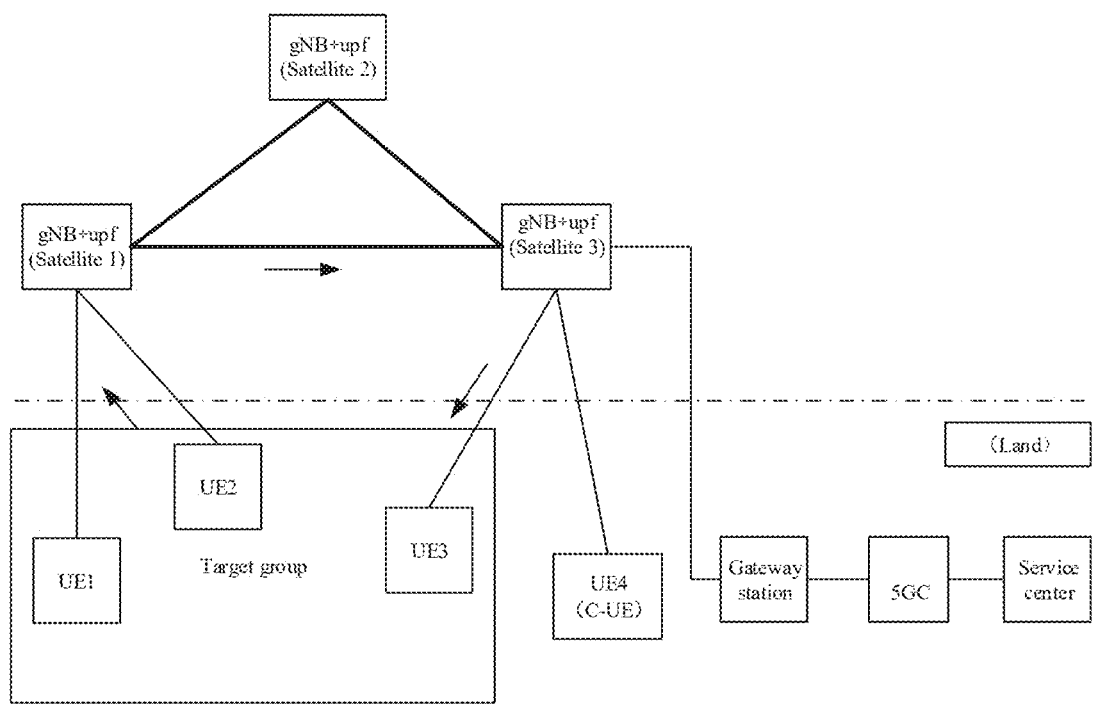
FIG. 4 is a space-ground integrated network architecture diagram of a method for floor control of an intra-group point-to-multipoint communication service provided by an embodiment of the present application.

FIG. 4 is a space-ground integrated network architecture diagram of a method for floor control of an intra-group point-to-multipoint communication service provided by an embodiment of the present application. As shown in FIG. 4, the network architecture diagram differs from the network architecture shown in FIG. 3 in that the service center of the T2mT service replaces the floor control server. The service center configures each group with a corresponding terminal device with the control right in advance. Illustratively, terminal device 1 (UE1 for short), terminal device 2 (UE2 for short) and terminal device 3 (UE3 for short) form a target group. Illustratively, as shown in FIG. 4, terminal device 4 outside the target group is the terminal device with the control right (C-UE for short) of the target group. Or not as shown in FIG. 4, any terminal device in the target group is the terminal device with the control right of the target group.

Based on the space-ground integrated network architecture of the present application, the service center sends the identification information of the terminal device with the control right to other group terminal devices, and the other group terminal devices request the floor from the terminal device with the control right. The service center sends the identification information of the target group and a control right role indication to the terminal device with the control right, and the terminal device with the control right performs a floor control operation on a group terminal device in the corresponding target group.

The embodiments of the present application can be applied to various systems, especially 5G systems. The 5G system includes a terminal device and a network device, and the core network device includes: a session management function network element (SMF).

The terminal device involved in the embodiments of the present application may be a device that provides voice and/or data connectivity to a user, a handheld device with a wireless connection function, or other processing devices connected to a wireless modem. The name of the terminal device may also vary in different systems. For example, in a 5G system, the terminal may be called a user equipment (UE). A wireless terminal device may communicate with one or more core networks (CN) via a radio access network (RAN). The wireless terminal device may be a mobile terminal device, such as a cell phone (or "cellular" phone) and a computer with a mobile terminal device, for example, a portable, a pocket-sized, a handheld, a computer built-in, or a vehicle-mounted mobile device, that exchanges language and/or data with the radio access network. For example, a personal communications system (PCS) terminal, a cordless phone, a session initiated protocol (SIP) phone, a wireless local loop (WLL) station, a (PDA) or other devices. The wireless terminal device can also be called a system, a subscriber unit, a subscriber station, a mobile station, a mobile, a remote station, an access point, a remote terminal device, an access terminal, a user terminal device (user terminal), a user agent, and a user device, which are not limited in the embodiments of the present application.

The embodiments of the present application will be described as follows clearly and comprehensively in conjunction with accompanying drawings in the embodiments of the present application. Apparently, the described embodiments are merely a part rather than all of the embodiments of the present application.

Figure 5:
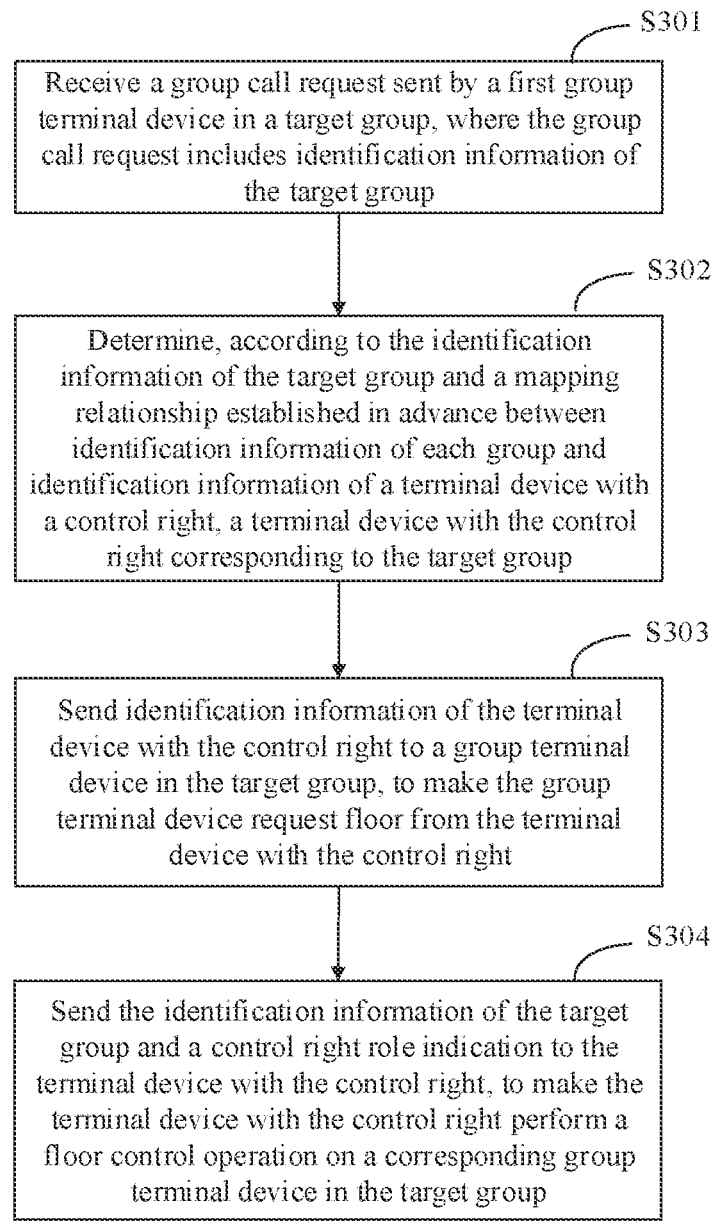
FIG. 5 is a schematic flowchart of a method for floor control of an intra-group point-to-multipoint communication service provided by an embodiment of the present application.

FIG. 5 is a schematic flowchart of a method for floor control of an intra-group point-to-multipoint communication service provided by an embodiment of the present application. As shown in FIG. 5, an executive subject of the embodiment is an apparatus for floor control of an intra-group point-to-multipoint communication service. The apparatus for floor control of an intra-group point-to-multipoint communication service can be located in a service center, where the service center is a point-to-multipoint communication service center within a group, and can provide business services through a server or a server cluster. The method for floor control of an intra-group point-to-multipoint communication service provided by the embodiment includes the following steps.

Step 301: receive a group call request sent by a first group terminal device in a target group, where the group call request includes identification information of the target group.

The target group is a group that is to perform an intra-group point-to-multipoint communication service.

In the embodiment, before performing the intra-group point-to-multipoint communication service, each group terminal device in the target group is required to establish a protocol data unit (PDU) session to the service center, and a certain group terminal device in the target group initiates a group call establishment procedure. The certain group terminal device is the first group terminal device in the target group.

In the embodiment, when the first group terminal device initiates the group call establishment procedure, it sends a group call request to the service center. Identification information of the target group (Group ID) is included in the group call request. The service center receives the group call request and the Group ID is obtained through parsing.

The Group ID may be a serial number or a name of the target group in all groups, which is information represents the unique target group.

Step 302: determine, according to the identification information of the target group and a mapping relationship established in advance between identification information of each group and identification information of a terminal device with a control right, a terminal device with the control right corresponding to the target group.

In the embodiment, before performing the intra-group point-to-multipoint communication service, the service center configures the terminal device with the control right for each group in advance according to the service policy, and establishes the mapping relationship between the identification information of each group and the identification information of the corresponding terminal device with the control right, and stores the mapping relationship. Therefore, after the identification information of the target group is obtained through parsing, the identification information of the terminal device with the control right corresponding to the identification information of the target group is determined in the mapping relationship, and then the terminal device with the control right corresponding to the target group is determined.

The terminal device with the control right is a terminal device with a floor control function, and the terminal device with the control right corresponding to the target group can be a group terminal device in the target group, or a terminal device outside the target group, which is not limited in the embodiment.

Step 303: send identification information of the terminal device with the control right to other group terminal devices in the target group, to make the other group terminal devices request floor from the terminal device with the control right.

In the embodiment, the group call establishment procedure can be used to send the identification information of the terminal device with the control right to the other group terminal devices in the target group, and the identification information of the other terminal devices with the control right can be referred to as: C-UE ID.

The C-UE ID may be a serial number of the terminal device with the control right among all terminal devices, or a username of the terminal device with the control right, etc., which is information represents a unique terminal device with the control right.

In the embodiment, after receiving the identification information of the terminal device with the control right, if there is a need to speak, the group terminal device requests the floor from the terminal device with the control right.

Step 304: send the identification information of the target group and a control right role indication to the terminal device with the control right, to make the terminal device with the control right perform a floor control operation on a group terminal device in the corresponding target group.

In the embodiment, the service center sends the identification information of the target group and the control right role indication to the terminal device with the control right, and according to the identification information of the target group and the control right role indication, the terminal device with the control right determines that itself has the control right on the corresponding target group, where the control right includes the floor control. When the group terminal device of the target group requests the floor from the terminal device with the control right, the terminal device with the control right performs the floor control operation.

It should be noted that, when the group terminal device of the target group requests the floor from the corresponding terminal device with the control right, or the terminal device with the control right performs the floor control operation on the group terminal device in the corresponding target group, signaling forwarding is performed through only the inter-satellite transmission tunnel without a need for forwarding through the gateway station deployed on the ground.

In the method for floor control of an intra-group point-to-multipoint communication service provided by the embodiment, a group call request sent by a first group terminal device in a target group is received, where the group call request includes identification information of the target group; according to the identification information of the target group and a mapping relationship established in advance between identification information of each group and identification information of a terminal device with a control right, a terminal device with the control right corresponding to the target group is determined; the identification information of the target group and a control right role indication are sent to the terminal device with the control right, to make the terminal device with the control right perform a floor control operation on a group terminal device in the corresponding target group. Since the service center configures each group with a corresponding terminal device with the control right in advance, the identification information of the terminal device with the control right is sent to the group terminal device in the target group, to make it clear to the group terminal device in the target group that the group terminal device in the target group requests the floor from the terminal device with the control right, and the identification information of the target group and the control right role indication are sent to the terminal device with the control right, to make it clear to the terminal device with the control right that the terminal device with the control right plays a role of the floor control of the corresponding target group, and the terminal device with the control right controls the floor of the corresponding target group. Therefore, the floor control task of the floor control server is distributed by groups, and the floor can be centrally controlled in each group at the same time, so the floor control can be performed more reasonably. In addition, as the terminal device performs the floor control on the terminal devices in the group, in the space-ground integrated network architecture, there is no need for a round trip between the air and the ground for the floor control process, and the time delay of the floor control can be effectively reduced, and the efficiency of floor control can be improved effectively.

Figure 6:
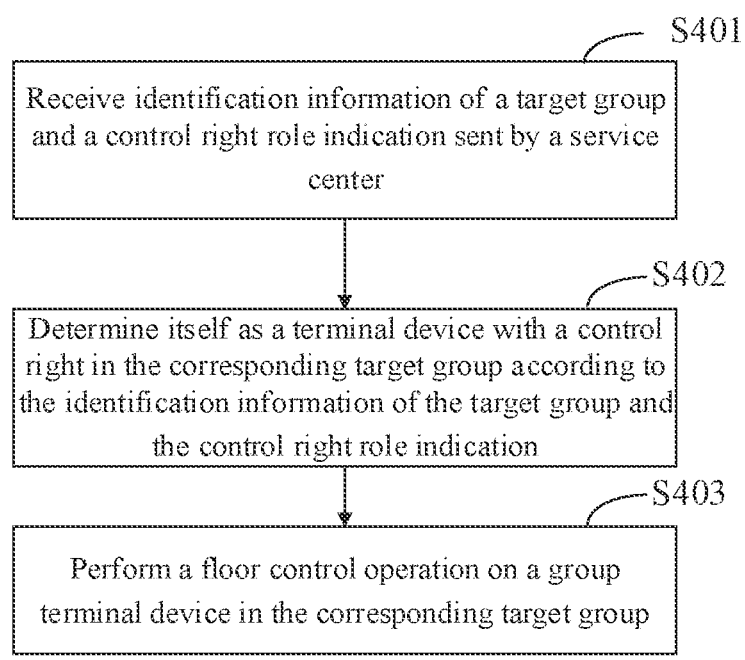
FIG. 6 is a schematic flowchart of a method for floor control of an intra-group point-to-multipoint communication service provided by another embodiment of the present application.

FIG. 6 is a schematic flowchart of a method for floor control of an intra-group point-to-multipoint communication service provided by another embodiment of the present application. As shown in FIG. 6, an executive subject of the method for floor control of an intra-group point-to-multipoint communication service provided by the embodiment is an apparatus for floor control of an intra-group point-to-multipoint communication service. The apparatus for floor control of an intra-group point-to-multipoint communication service is located in a terminal device with a control right. The method for floor control of an intra-group point-to-multipoint communication service provided by the embodiment includes the following steps.

Step 401, receive identification information of a target group and a control right role indication sent by a service center.

In the embodiment, after the service center determines the terminal device with the control right corresponding to the target group, a group call establishment procedure may be utilized to send the identification information of the target group and the control right role indication to the terminal device with the control right, the terminal device with the control right receives the identification information of the target group and the control right role indication through the group call establishment procedure.

Step 402, determine itself as a terminal device with a control right in the corresponding target group according to the identification information of the target group and the control right role indication.

In the embodiment, the terminal device with the control right determines itself as the terminal device with the control right in the target group corresponding to the identification information, according to the identification information of the target group and the control right role indication. The terminal device with the control right can perform a floor control operation on a group terminal device in the target group.

Step 403, perform a floor control operation on a group terminal device in the corresponding target group.

In the embodiment, after the group terminal device in the target group sends a floor request to the terminal device with the control right through the inter-satellite transmission tunnel, the terminal device with the control right performs the floor control operation according to the floor request.

The method for floor control of the intra-group point-to-multipoint communication service provided by the embodiment is to receive the identification information of the target group and the control right role indication sent by the service center; determine, according to the identification information of the target group and the control right role indication, itself as the terminal device with the control right of the corresponding target group; perform the floor control operation on the group terminal device in the corresponding target group. The terminal device with the control right receives the identification information of the target group and the control right role indication, to make it clear to the terminal device with the control right that the terminal device with the control right plays a role of the floor control of the corresponding target group, and the terminal device with the control right controls the floor of the corresponding target group. Therefore, the floor control task of the floor control server is distributed by groups, and the floor can be centrally controlled in each group at the same time, so the floor control can be performed more reasonably. In addition, as the terminal device performs the floor control on the terminal devices in the group, in the space-ground integrated network architecture, there is no need for a round trip between the air and the ground for the floor control process, and the time delay of the floor control can be effectively reduced, and the efficiency of floor control can be improved effectively.

Figure 7:
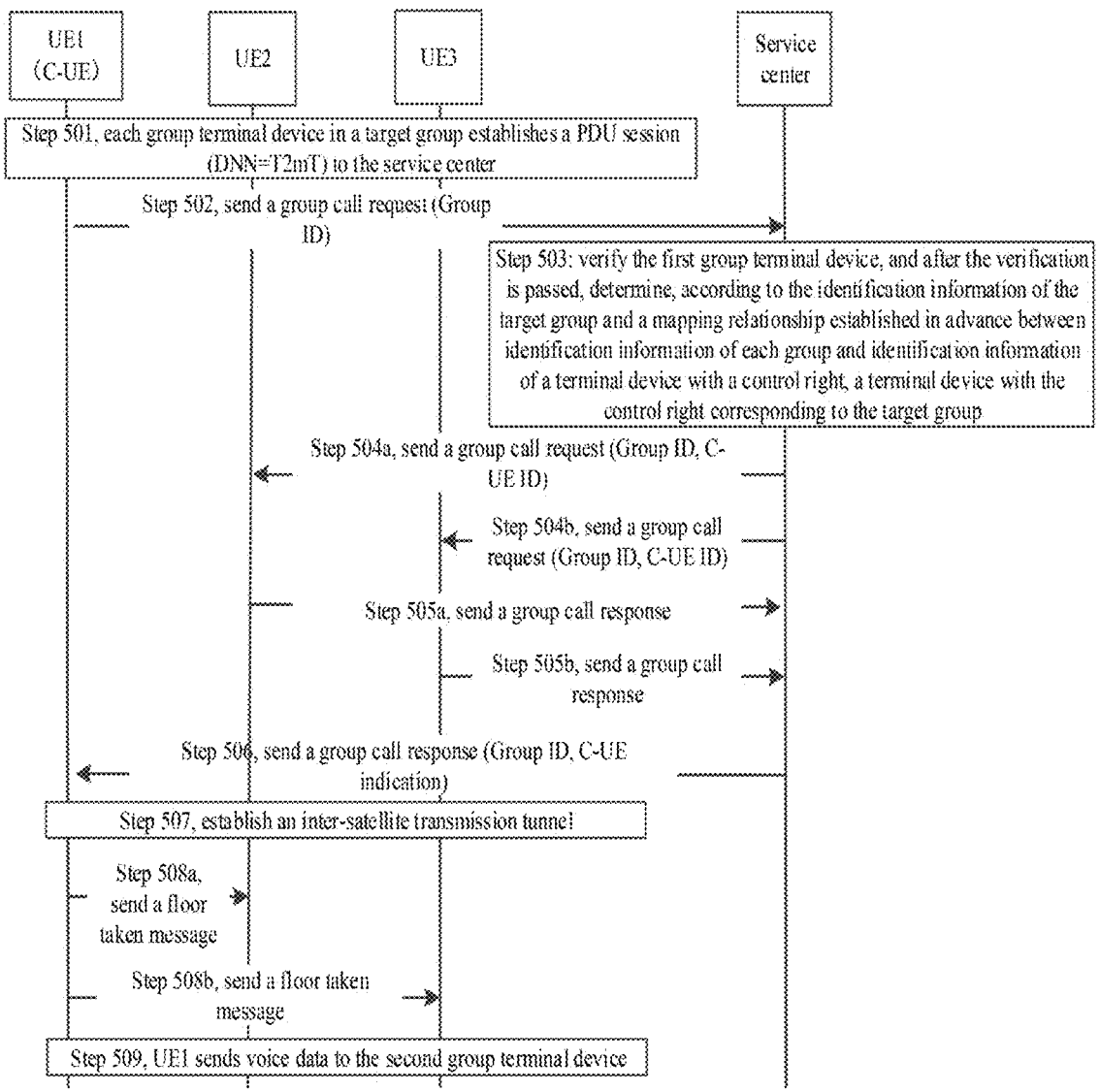
FIG. 7 is a schematic flowchart of signaling interaction of a method for floor control of an intra-group point-to-multipoint communication service provided by still another embodiment of the present application.

FIG. 7 is a schematic flowchart of signaling interaction of a method for floor control of an intra-group point-to-multipoint communication service provided by still another embodiment of the present application. As shown in FIG. 7, the method for floor control of the intra-group point-to-multipoint communication service provided by the embodiment, based on the embodiments, when the target group with the control right corresponding to the terminal device is the first group terminal device, and the first group terminal device initiates the group call establishment procedure, further refines the steps 303-304 in the embodiment and the step 401 in the embodiments. In the embodiment, three group terminal devices in the target group are taken as an example for illustration. The method for floor control of an intra-group point-to-multipoint communication service provided by the embodiment includes the following steps.

Step 501, each group terminal device in the target group establishes a PDU session to the service center.

The PDU session includes: a data network name (DNN) identifier. In the embodiment, the DNN identifier is T2mT.

Step 502, the first group terminal device in the target group sends a group call request to the service center, where the group call request includes identification information of the target group.

As shown in FIG. 7, the first group terminal device is UE1. The full English name of the service center is: T2mT Service Center.

Correspondingly, the service center receives the group call request sent by the first group terminal device in the target group, where the group call request includes the identification information of the target group.

Step 503: the service center verifies the first group terminal device, and after the verification is passed, determines, according to the identification information of the target group and a mapping relationship established in advance between identification information of each group and identification information of a terminal device with a control right, a terminal device with the control right corresponding to the target group.

When the service center verifies the first group terminal device, the service center verifies whether the first group terminal device is in the group, whether the first group terminal device has authority to initiate a group call request, and the like.

In one embodiment, in the embodiment, before the service center determines, according to the identification information of the target group and the mapping relationship established in advance between the identification information of each group and the identification information of the terminal device with the control right, the terminal device with the control right corresponding to the target group, the method further includes:

setting a terminal device with the control right for each group according to a service policy; establishing the mapping relationship between the identification information of each group and the identification information of the corresponding terminal device with the control right.

In one embodiment, the service center acquires the service policy of each group, determines a most suitable terminal device with a control right for each group according to the service policy, and then establishes the mapping relationship between the identification information of each group and the identification information of the corresponding terminal device with the control right. The service center acquires the mapping relationship after receiving the identification information of the target group, and determines the identification information of the terminal device with the control right corresponding to the target group according to the mapping relationship, and then determines the terminal device with the control right corresponding to the target group.

Step 504, the service center sends a group call request to a second group terminal device in the target group, where the group call request includes identification information of the first group terminal device, to make the second group terminal device request the floor form the first group terminal device.

It should be noted that, step 504 is an implementation of step 303.

The second group terminal device is a terminal device in the target group other than the first group terminal device. In FIG. 7, the second group terminal device is UE2 and UE3. Therefore, step 504 includes step 504a and step 504b.

Step 504a, the service center sends a group call request to UE2, where the group call request includes the identification information of the first group terminal device, to make UE2 request the floor from UE1.

The first group terminal device is the terminal device with the control right, so the identification information of the first group terminal device is referred to as C-UE ID for short.

Step 504b, the service center sends a group call request to UE3, where the group call request includes the identification information of the first group terminal device, to make UE3 request the floor from UE1.

As shown in FIG. 7, the group call request also carries the identification information of the target group, which is referred to as Group ID for short.

Step 505, the second group terminal device in the target group sends a group call response to the service center.

In FIG. 7, the second group terminal device is UE2 and UE3. Therefore, step 505 includes step 505a and step 505b.

Step 505a, UE2 sends a group call response to the service center.

Step 505b, UE3 sends a group call response to the service center.

Step 506, the service center sends a group call response to the first group terminal device, where the group call response includes the identification information of the target group and a control right role indication, to make the first group terminal device perform a floor control operation on a group terminal device in the corresponding target group.

The control right role indication is referred to as: C-UE indication for short.

It should be noted that, step 506 is an implementation of step 304. Correspondingly, as an implementation of step 401, the first group terminal device receives the group call response sent by the service center, where the group call response includes the identification information of the target group and the control right role indication.

In the embodiment, the first group terminal device parses the group call response, acquires the identification information of the target group and the control right role indication, and determines that the first group terminal device is the terminal device with the control right corresponding to the target group. When the second group terminal device (such as, UE2 or UE3) in the target group sends a floor request, the first group terminal device performs the floor control operation on the group terminal device in the corresponding target group.

It can be understood that, when the service center sends the group call response to the first group terminal device, the floor may also be granted to the first group terminal device by default.

Step 507, each group terminal device in the target group establishes an inter-satellite transmission tunnel.

The inter-satellite transmission tunnel is a transmission tunnel used for media plane data and a floor control message. In FIG. 7, UE1, UE2 and UE3 establish the inter-satellite transmission tunnel.

Step 508, the first group terminal device sends a floor taken message to the second group terminal device.

In FIG. 7, the second group terminal device is UE2 and UE3. Therefore, step 508 includes step 508a and step 508b.

Step 508a, UE1 sends a floor taken message to UE2.

Step 508b, UE1 sends a floor taken message to UE3.

Step 509, UE1 sends voice data to the second group terminal device.

In the method for floor control of the intra-group point-to-multipoint communication service provided by the embodiment, when the terminal device with the control right is the first group terminal device in the target group, and the first group terminal device initiates a group call request, through the group call establishment procedure, the service center can send the identification information of the terminal device with the control right to the group terminal device in the target group, and send the identification information of the target group and the control right role indication to the terminal device with the control right, which can not only perform the floor control more reasonably, reduce the time delay of floor control effectively, improve the efficiency of floor control effectively, but also can make full use of the network resources in the group call establishment procedure, satisfying the floor control in the scenario where the terminal device with the control right is the first group terminal device in the target group and the first group terminal device initiates the group call request.

Figure 8:
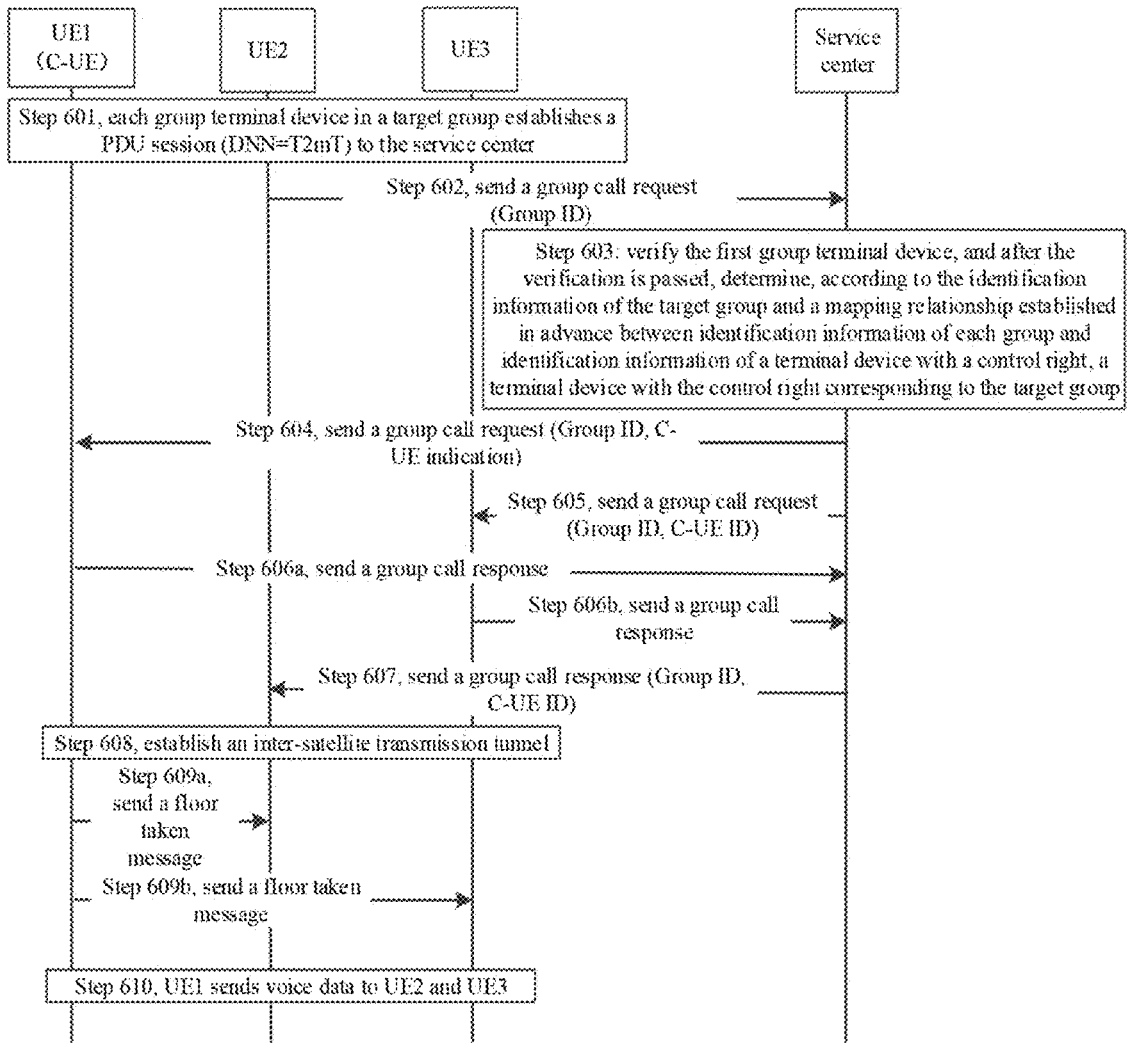
FIG. 8 is a schematic flowchart of signaling interaction of a method for floor control of an intra-group point-to-multipoint communication service provided by yet another embodiment of the present application.

FIG. 8 is a schematic flowchart of signaling interaction of a method for floor control of an intra-group point-to-multipoint communication service provided by yet another embodiment of the present application. As shown in FIG. 8, the method for floor control of the intra-group point-to-multipoint communication service provided by the embodiment, based on the embodiments, when the target group with the control right corresponding to the terminal device is a third group terminal device in the target group, and the first group terminal device initiates the group call establishment procedure, further refines steps 303-304 in the embodiments and step 401 in the embodiments. In the embodiment, three group terminal devices in the target group are taken as an example for illustration. The method for floor control of an intra-group point-to-multipoint communication service provided by the embodiment includes the following steps.

Step 601, each group terminal device in the target group establishes a PDU session to the service center.

A DNN identifier is included in the PDU session. In the embodiment, the DNN identifier is T2mT.

Step 602, the first group terminal device in the target group sends a group call request to the service center, where the group call request includes identification information of the target group.

As shown in FIG. 8, the first group terminal device is UE2.

Correspondingly, the service center receives the group call request sent by the first group terminal device in the target group, where the group call request includes the identification information of the target group.

Step 603: the service center verifies the first group terminal device, and after the verification is passed, determines, according to the identification information of the target group and a mapping relationship established in advance between identification information of each group and identification information of a terminal device with a control right, a terminal device with the control right corresponding to the target group.

When the service center verifies the first group terminal device, it is similar to step 503, which will not be repeated here.

Step 604, the service center sends a group call request to the third group terminal device, the group call request includes the identification information of the target group and a control right role indication, to make the third group terminal device perform the floor control operation on the group terminal device in the corresponding target group.

It should be noted that, step 604 is an implementation of step 304. Correspondingly, as an implementation of step 401, the third group terminal device receives the group call request sent by the service center, where the group call request includes the identification information of the target group and the control right role indication.

The third group terminal device is any terminal device of the second group terminal device in the target group other than the first group terminal device. In FIG. 8, the second group terminal device is UE1 and UE3, the third group terminal device is UE1, and the second group terminal device other than the third group terminal device is UE3.

In the embodiment, the third group terminal device, as the terminal device with the control right, acquires the identification information of the target group and the control right role indication, and determines that the third group terminal device is the terminal device with the control right corresponding to the target group. When the first terminal device (such as, UE2) in the target group or the second group terminal device (such as UE3) other than the third group sends the floor request, the third group terminal device performs the floor control operation on the group terminal device in the corresponding target group.

Step 605: send a group call request to a second group terminal device in the target group except the third group terminal device, where the group call request includes identification information of the third group terminal device, to make the second group terminal device other than the third group terminal device request the floor from the third group terminal device.

Step 606, the second group terminal device in the target group sends a group call response to the service center.

In FIG. 8, the second group terminal device may be UE1 and UE3. The third group terminal device is UE1. Therefore, step 606 includes step 606a and step 606b.

Step 606a, UE1 sends a group call response to the service center.

Step 606b, UE3 sends a group call response to the service center.

Step 607, the service center sends a group call response to the first group terminal device, where the group call response includes identification information of the third group terminal device, to make the first group terminal device request the floor from the third group terminal device.

It should be noted that, step 605 and step 607 are implementations of step 303.

When the group call response is sent in step 607, the Group ID is also included.

It can be understood that, when the service center sends the group call request to the third group terminal device, the floor may also be granted to the third group terminal device by default.

Step 608, each group terminal device in the target group establishes an inter-satellite transmission tunnel.

The inter-satellite transmission tunnel is a transmission tunnel used for media plane data and a floor control message. In FIG. 8, UE1, UE2 and UE3 establish the inter-satellite transmission tunnel.

Step 609, the third group terminal device sends a floor taken message to the first group terminal device and the second group terminal device other than the third group terminal device.

In FIG. 8, the first group terminal device is UE2. The second group terminal device other than the third group terminal device is UE3, so step 609 includes step 609*a* and step 609*b*.

Step 609*a*, UE1 sends a floor taken message to UE2.
Step 609*b*, UE1 sends a floor taken message to UE3.
Step 610, the third group terminal device sends voice data to the first group terminal device and the second group terminal device other than the third group terminal device.

In the method for floor control of the intra-group point-to-multipoint communication service provided by the embodiment, when the terminal device with the control right is the third group terminal device in the target group, and the first group terminal device initiates a group call request, through the group call establishment procedure, the service center can send the identification information of the terminal device with the control right to the group terminal device in the target group, and send the identification information of the target group and the control right role indication to the terminal device with the control right, which can not only perform the floor control more reasonably, reduce the time delay of floor control effectively, improve the efficiency of floor control effectively, but also can make full use of the resources in the group call establishment procedure, satisfying the floor control in the scenario where the terminal device with the control right is the third group terminal device in the target group and the first group terminal device initiates the group call request.

Figure 9:
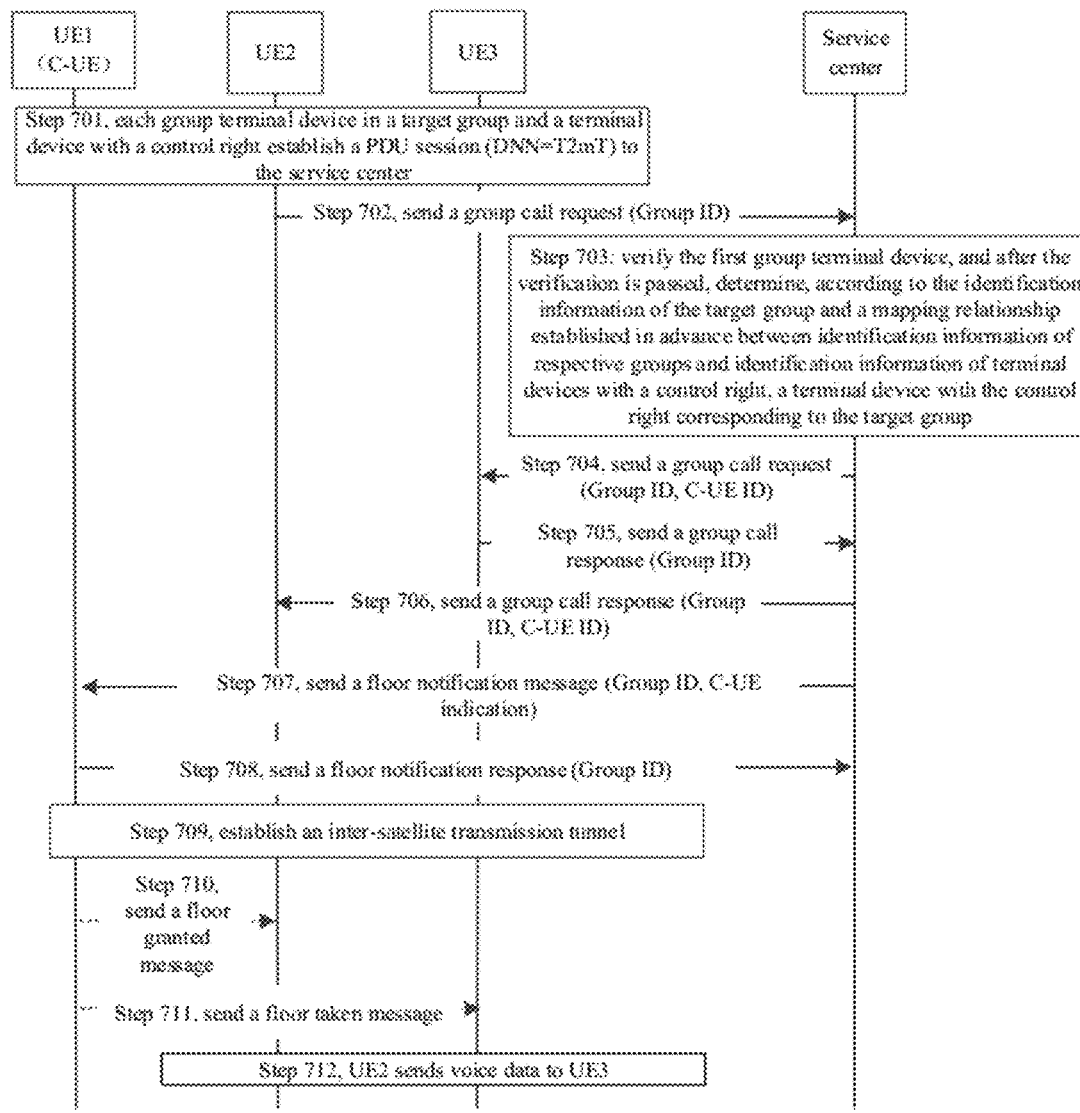
FIG. 9 is a schematic flowchart of signaling interaction of a method for floor control of an intra-group point-to-multipoint communication service provided by yet another embodiment of the present application.

FIG. 9 is a schematic flowchart of signaling interaction of a method for floor control of an intra-group point-to-multipoint communication service provided by yet another embodiment of the present application. As shown in FIG. 9, the method for floor control of the intra-group point-to-multipoint communication service provided by the embodiment, based on the embodiments, when the terminal device with the control right corresponding to the target group is a terminal device outside the target group, further refines steps 303-304 in the embodiments and step 401 in the embodiments. In the embodiment, two group terminal devices in the target group are taken as an example for illustration. The method for floor control of an intra-group point-to-multipoint communication service provided by the embodiment includes the following steps.

Step 701, each group terminal device in a target group and a terminal device with a control right establish a PDU session to the service center.

A DNN identifier is included in the PDU session. In the embodiment, the DNN identifier is T2mT.

Step 702, the first group terminal device in the target group sends a group call request to the service center, where the group call request includes identification information of the target group.

As shown in FIG. 9, the first group terminal device is UE2.

Correspondingly, the service center receives the group call request sent by the first group terminal device in the target group, where the group call request includes the identification information of the target group.

It should be noted that, when the first group terminal device sends the group call request to the service center, the group call request may also carry an identifier for the floor request.

Step 703: the service center verifies the first group terminal device, and after the verification is passed, determines, according to the identification information of the target group and a mapping relationship established in advance between identification information of each group and identification information of a terminal device with a control right, a terminal device with the control right corresponding to the target group.

When the service center verifies the first group terminal device, it is similar to step 503, which will not be repeated here.

Step 704, the service center sends a group call request to a second group terminal device in the target group, where the group call request includes identification information of the terminal device outside the target group, to make the second group terminal device request the floor form the terminal device outside the target group.

The second group terminal device is a terminal device in the target group other than the first group terminal device.

In FIG. 9, the second group terminal device in the target group is UE3. Therefore, the service center sends a group call request to UE3 in the target group.

Step 705, the second group terminal device sends a group call response to the service center, where the group call response includes the identification information of the target group.

Step 706: the service center sends a group call response to the first group terminal device, where the group call response includes the identification information of the terminal device outside the target group, to make the first group terminal device request the floor from the terminal device outside the target group.

In the embodiment, step 704 and step 706 are implementations of step 303.

Step 707, the service center sends a floor notification message to the terminal device outside the target group, where the floor notification message includes the identification information of the target group and a control right role indication, to make the terminal device outside the target group perform the floor control operation on a group terminal device in the corresponding target group.

The floor notification message may be called floor notification, and the floor notification message is not defined in the TS23.379 standard, and is a newly added message for sending the identification information of the target group and the control right role indication to the terminal device with the control right outside the target group.

It should be noted that, step 707 is an implementation of step 304. Correspondingly, as a manner of step 401, the floor notification message sent by the service center is received, where the floor notification message includes the identification information of the target group and the control right role indication.

In the embodiment, if in step 702, the group call request carries the identifier for the floor request by the first group terminal device, the floor notification message may further include the identifier for the floor request by the first group terminal device.

Step 708, the terminal device outside the target group sends a floor notification response to the service center.

Group ID is included in the floor notification response. The floor notification response is a response corresponding to the floor notification message, which is not defined in the TS23.379 standard, and the floor notification response is a newly added message for making the service center ascertain that the identification information of the target group and the control right role indication have been sent to the terminal device outside the target group.

In the embodiment, step 706 and step 707 are the process of notifying the floor.

Step 709, each group terminal device in the target group and the terminal device outside the target group establish an inter-satellite transmission tunnel.

The inter-satellite transmission tunnel is a transmission tunnel used for media plane data and a floor control message. In FIG. 9, UE1, UE2 and UE3 establish the inter-satellite transmission tunnel.

Step 710: if the terminal device outside the target group determines that the floor notification message includes the identifier for the floor request by the first group terminal device, the terminal device outside the target group sends a floor granted message to the first group terminal device.

Step 711, the terminal device outside the target group sends a floor taken message to the second group terminal device.

Step 712, the first group terminal device sends voice data to the second group terminal device.

In the method for floor control of the intra-group point-to-multipoint communication service provided by the embodiment, when the terminal device with the control right is a terminal device outside the target group, the service center can send the identification information of the terminal device with the control right to the group terminal device in the target group through the group call establishment procedure, and send the identification information of the target group and the control right role indication to the terminal device with the control right through the newly added floor notification message in the group call establishment procedure, which can not only perform the floor control more reasonably, reduce the time delay of floor control effectively, improve the efficiency of floor control effectively, but also can make full use of the group call establishment procedure, satisfying the floor control in the scenario where the terminal device with the control right is a terminal device outside the target group.

Figure 10:
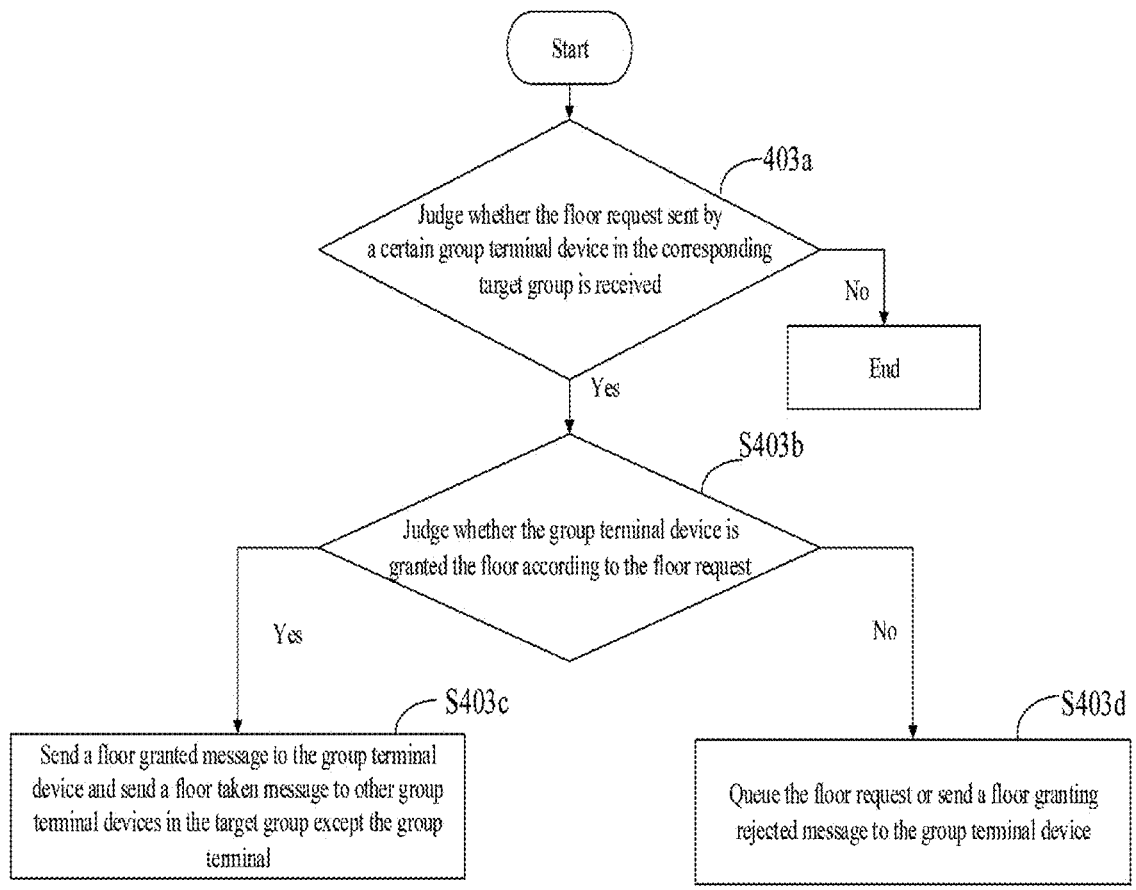
FIG. 10 is a schematic flowchart of a method for floor control of an intra-group point-to-multipoint communication service provided by yet another embodiment of the present application.

FIG. 10 is a schematic flowchart of a method for floor control of an intra-group point-to-multipoint communication service provided by another embodiment of the present application. As shown in FIG. 10, an executive subject of the method for floor control of an intra-group point-to-multipoint communication service provided by the embodiment is a terminal device with a control right. The method for floor control of the intra-group point-to-multipoint communication service provided by the embodiment, based on the method for floor control of the intra-group point-to-multipoint communication service in the embodiments, further refines step 403. The method for floor control of an intra-group point-to-multipoint communication service provided by the embodiment includes the following steps.

Step 403a, determine whether a floor request sent by a certain group terminal device in the corresponding target group is received; if yes, execute step 403b, otherwise end.

In the embodiment, the terminal device with the control right plays a role of floor control of the group terminal device in the corresponding target group. Therefore, the terminal device with the control right can monitor whether a floor request sent by a certain group terminal device in the corresponding target group is received. If a floor request sent by a certain group terminal device in the corresponding target group is detected, a floor control operation is required to be performed. If no floor request sent by a certain group terminal device in the corresponding target group is detected, it means that currently there is no floor request for the inter-group point-to-multipoint communication service in the target group, and end.

Step 403b, determine whether the group terminal device is granted the floor according to the floor request; if yes, execute step 403c, otherwise execute step 403d.

In the embodiment, the floor request sent by the group terminal device in the target group may include a floor priority, and may also include other necessary information. The terminal device with the control right determines to take a corresponding operation for the floor request based on the standard. Illustratively, the terminal device with the control right determines to grant, reject or queue the floor request based on the floor priority of the group terminal device and/or a type of the group terminal device.

Step 403c, send a floor granted message to the group terminal device and send a floor taken message to other group terminal devices in the target group except the group terminal.

In the embodiment, if it is determined to grant the floor to the group terminal device according to the floor request, a floor granted message is sent to the group terminal device. In order to notify other group terminal devices in the target group that the floor has been taken by the group terminal device, a floor taken message is sent to other group terminal devices in the target group except the group terminal device.

Step 403d, queue the floor request or send a floor granting rejected message to the group terminal device.

In the embodiment, if it is determined not to grant the floor to the group terminal device according to the floor request, it is determined to reject or queue the floor request based on the floor priority of the group terminal device and/or the type of the group terminal device, and the floor request is queued or a floor granting rejected message is sent to the group terminal device.

In the method for floor control of the intra-group point-to-multipoint communication service provided by the embodiment, when the terminal device with the control right performs the floor control operation on the group terminal device in the corresponding target group, whether the floor request sent by a certain group terminal device in the corresponding target group is received is determined; if it is determined that the floor request sent by the certain group terminal device is received, whether to grant the floor to the group terminal device according to the floor request is determined; if it is determined that the group terminal device is granted the floor, a floor granted message is sent to the group terminal device and a floor taken message is sent to other group terminal devices in the target group except the group terminal. The terminal device with the control right can smoothly perform, independently from the service center, the floor control operation on the group terminal device in the corresponding target group. In the space-ground integrated network architecture, there is no need for a round trip between the air and the ground, and the time delay of the floor control can be effectively reduced, and the efficiency of floor control can be improved effectively.

Embodiment 7

Figure 11:
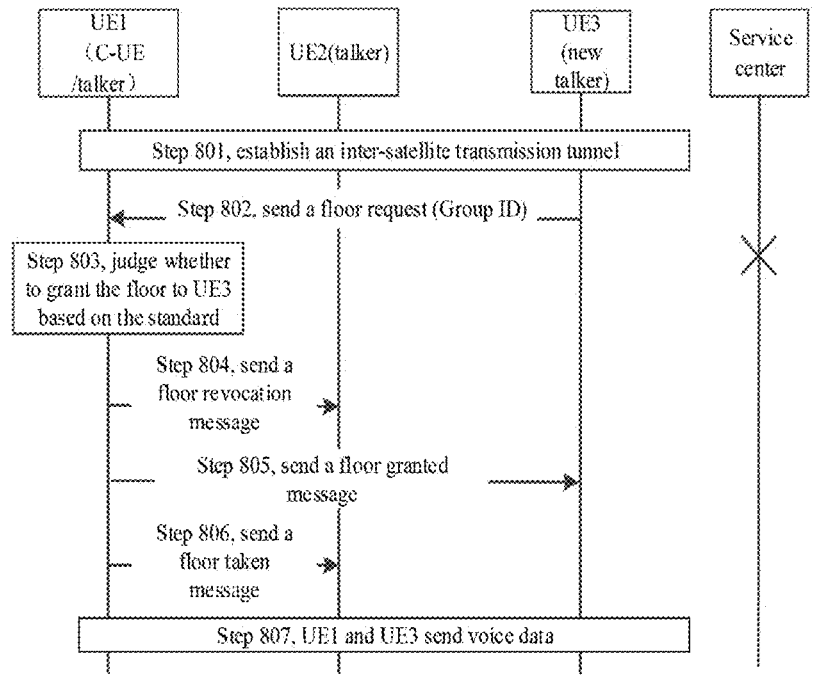
FIG. 11 is a schematic flowchart of signaling interaction of a method for floor control of an intra-group point-to-multipoint communication service provided by still another embodiment of the present application.

FIG. 11 is a schematic flowchart of signaling interaction of a method for floor control of an intra-group point-to-multipoint communication service provided by still another embodiment of the present application. As shown in FIG. 11, the method for floor control of the intra-group point-tomultipoint communication service provided by the embodiment, based on the method for floor control of the intra-group point-to-multipoint communication service provided by the embodiments, taking the terminal device with the control right being UE1, and the terminal device currently having the floor being UE1 and UE2 as an example, introduces the method for floor control of the intra-group point-to-multipoint communication service in more detail. The method for floor control of an intra-group point-to-multipoint communication service provided by the embodiment includes the following steps.

Step 801, establish an inter-satellite transmission tunnel.

The inter-satellite transmission tunnel is a transmission tunnel used for media plane data and a floor control message. In FIG. 11, UE1, UE2 and UE3 establish the inter-satellite transmission tunnel. The terminal device with the control right is UE1, and the terminal device currently having the floor is UE1 and UE2.

Step 802, UE3 sends a floor request to UE1.

Step 803, UE1 determines whether to grant the floor to UE3 based on the standard.

Illustratively, UE1 determines whether to grant the floor to UE3 based on a floor priority and/or a type of the UE 3.

Step 804, if it is determined to grant the floor to UE3, UE1 sends a floor revocation message to UE2.

Step 805, UE1 sends a floor granted message to UE3.

Step 806, UE1 sends a floor taken message to UE2.

The floor taken message carries identification information of UE3 granted the floor currently.

Step 807, UE1 and UE3 send voice data.

It should be noted that, the terminal device with the control right performs other floor control procedures, for example, floor release and floor rewriting, of the floor control operation on the group terminal device in the corresponding target group, which are similar to the processes of floor requesting, floor granting, and floor taking shown in FIG. 11 and will not be repeated here.

Figure 12:
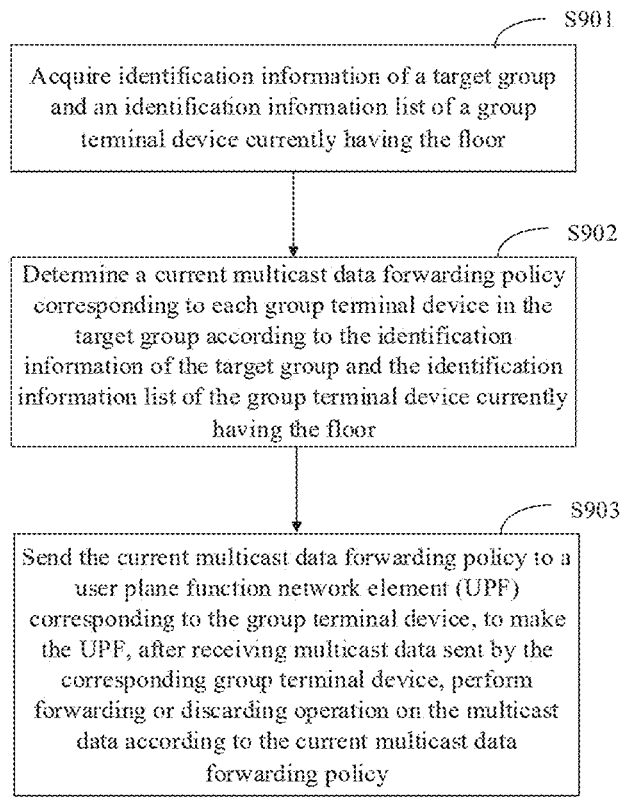
FIG. 12 is a schematic flowchart of a method for floor control of an intra-group point-to-multipoint communication service provided by still another embodiment of the present application.

FIG. 12 is a schematic flowchart of a method for floor control of an intra-group point-to-multipoint communication service provided by still another embodiment of the present application. As shown in FIG. 12, an executive subject of the method for floor control of the intra-group point-to-multipoint communication service provided by the embodiment is a session management function network element (SMF). The SMF is located in a 5G core network of the network architecture shown in FIG. 4. The method for floor control of the intra-group point-to-multipoint communication service provided by an embodiment of the present application includes the following steps.

Step 901, acquire identification information of a target group and an identification information list of a group terminal device currently having the floor.

The identification information list of one or more group terminal devices currently having the floor is determined by a service center, or the identification information list of one or more group terminal devices currently having the floor is determined by a terminal device with a control right corresponding to the target group, after the terminal device with the control right corresponding to the target group determines, according to the identification information of the target group and a control right role indication, itself as the terminal device with the control right in the corresponding target group to perform a floor control operation on a group terminal device in the target group; and the control right role indication is sent by the service center to the terminal device with the control right.

In one embodiment, in the embodiment, if the service center grants the floor to the terminal device with the control right by default when sending the identification information of the target group and the control right role indication to the terminal device with the control right, the service center sends the identification information of the target group and the identification information list of the group terminal device currently having the floor to the SMF. The SMF receives the identification information of the target group and the identification information list of the group terminal device currently having the floor sent by the service center. In this manner, there is identification information of the terminal device having the control right in the identification information list of the group terminal device currently having the floor.

In one embodiment, after the terminal device with the control right corresponding to the target group performs the floor control operation on the group terminal device in the target group, the terminal device with the control right determines the identification information list of the group terminal device currently having the floor, and send the identification information of the target group and the identification information list of the group terminal device currently having the floor to the SMF directly, or the service center receives the identification information list of the group terminal device currently having the floor sent by the terminal device with the control right, and sends to the SMF. The SMF receives the identification information of the target group and the identification information list of the group terminal device currently having the floor sent by the terminal device with the control right. In this manner, the identification information list of the group terminal device currently having the floor includes identification information of the group terminal device in the target group.

Therefore, in the embodiment, as an implementation, for acquiring the identification information of the target group and the identification information list of the group terminal device currently having the floor, the SMF receives the identification information of the target group and the identification information list of the group terminal device currently having the floor sent by the service center or the terminal device with the control right.

Step 902: determine a current multicast data forwarding policy corresponding to each group terminal device in the target group according to the identification information of the target group and the identification information list of the group terminal device currently having the floor.

As an implementation, in the embodiment, the SMF determines, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device currently not having the floor.

In one embodiment, since the group terminal device currently not having the floor may maliciously send voice data, in order to strengthen the control over the voice data sent by the group terminal device currently not having the floor, the SMF acquires the identification information of the target group and the identification information list of the group terminal device currently having the floor, determines that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device currently not having the floor.

Step 903: send the current multicast data forwarding policy to a user plane function network element (UPF) corresponding to the group terminal device, to make the UPF, after receiving multicast data sent by the corresponding group terminal device, perform forwarding or discarding operation on the multicast data according to the corresponding current multicast data forwarding policy.

In the embodiment, the current multicast data forwarding policy can be sent to the UPF corresponding to the group terminal device by using a session procedure in the existing standard. After the UPF receives the multicast data sent by the corresponding group terminal device, the UPF acquires the corresponding multicast forwarding policy. If the multicast forwarding policy is allowing forwarding multicast data, the UPF performs forwarding operation on the multicast data. If the multicast forwarding policy is discarding multicast data, the UPF performs discarding operation on the multicast data.

The multicast data may be voice data.

In the method for floor control of the intra-group point-to-multipoint communication service provided by an embodiment, by acquiring the identification information of the target group and the identification information list of the group terminal device currently having the floor, determining a current multicast data forwarding policy corresponding to each group terminal device in the target group according to the identification information of the target group and the identification information list of the group terminal device currently having the floor, and sending the current multicast data forwarding policy to a UPF corresponding to the group terminal device, to make the UPF, after receiving multicast data sent by the corresponding group terminal device, perform forwarding or discarding operation on the multicast data according to the current multicast data forwarding policy, the SMF is enabled to be aware of the identification information list of the group terminal device currently having the floor, and make the UPF update the multicast forwarding policy of the corresponding group terminal device according to the identification information list of the group terminal device currently having the floor and thus perform operations on multicast data according to the multicast forwarding policy, effectively preventing the group terminal device not having the floor from sending voice data maliciously, and strengthening the control over sending of the voice data by the group terminal device not currently having the floor.

Figure 13:
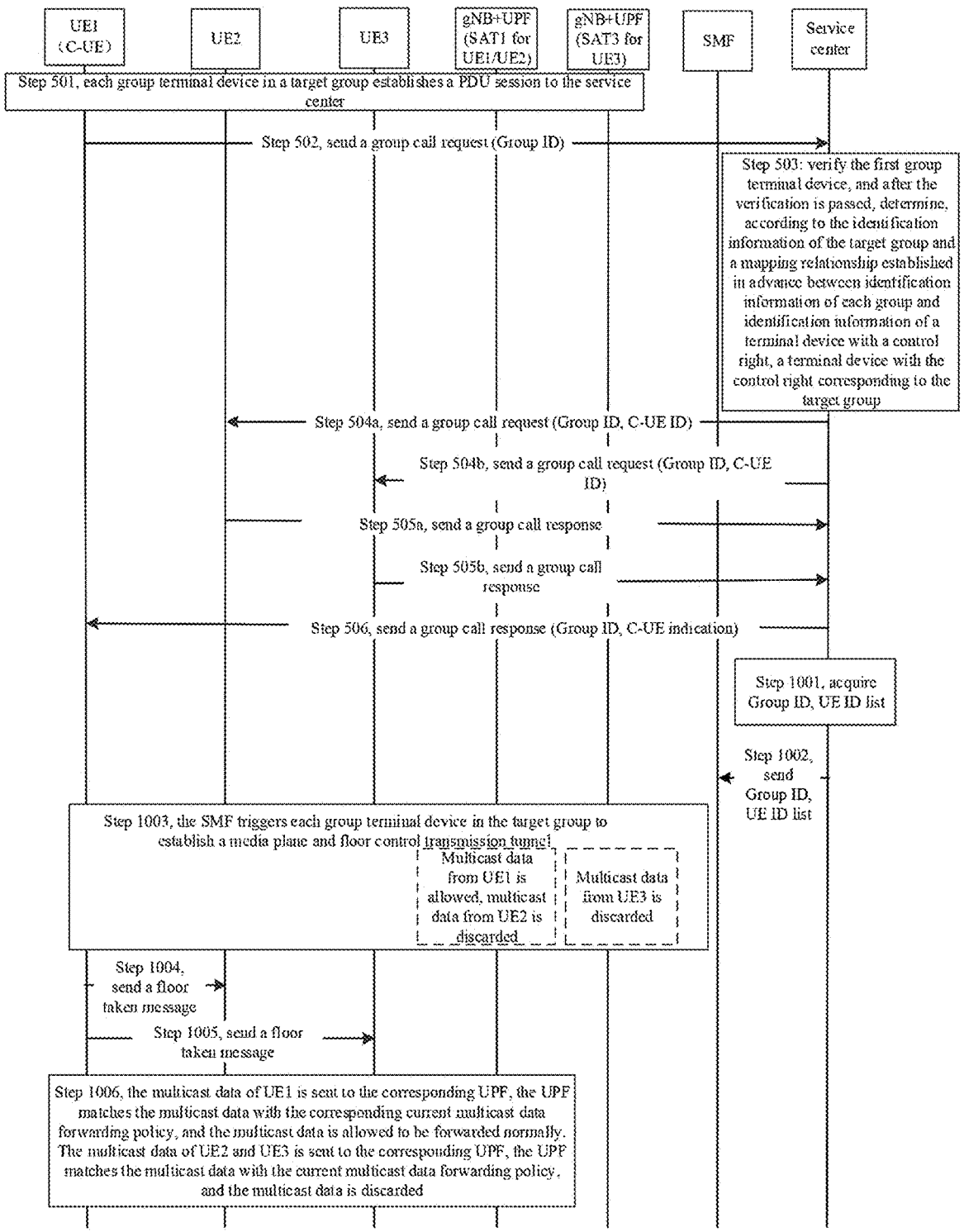
FIG. 13 is a schematic flowchart of signaling interaction of a method for floor control of an intra-group point-tomultipoint communication service provided by still another embodiment of the present application.

FIG. 13 is a schematic flowchart of signaling interaction of a method for floor control of an intra-group point-to-multipoint communication service provided by still another embodiment of the present application. As shown in FIG. 13, the method for floor control of the intra-group point-to-multipoint communication service provided by the embodiment, based on the method for floor control of the intra-group point-to-multipoint communication service provided by the embodiments, involves an interaction process in a scenario that the identification information of the target group and the identification information list of the group terminal device currently having the floor are acquired from the service center. In the embodiment, take the terminal device with the control right corresponding to the target group being the first group terminal device, and the first group terminal device initiating the group call establishment procedure as an example for illustration. The method for floor control of the intra-group point-to-multipoint communication service provided by an embodiment of the present application includes the following steps.

Step 1001, a service center acquires an identification information list of a group terminal device currently having the floor.

In the embodiment, before step 1001 is executed, as shown in step 501 to step 506 in the embodiments, a group call establishment procedure is performed. The service center grants the floor to the terminal device with the control right by default. The terminal device with the control right is a first group terminal device. Therefore, the identification information list of the group terminal device currently having the floor acquired by the service center includes the identification information of the terminal device with the control right. That is, the identification information of the first group terminal device is included.

Step 1002, the service center sends the identification information of the target group and the identification information list of the group terminal device currently having the floor to an SMF, to make the SMF determine a current multicast data forwarding policy corresponding to each group terminal device in the target group according to the identification information of the target group and the identification information list of the group terminal device currently having the floor.

Correspondingly, the SMF determines, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device not currently having the floor.

As shown in FIG. 13, the SMF determines that the multicast data forwarding policy of UE1 in the target group is allowing UE1 to forward the multicast data. The SMF determines that the multicast data forwarding policy of UE2 and UE3 in the target group is discarding their multicast data.

Step 1003, the SMF triggers each group terminal device in the target group to establish a media plane and floor control transmission tunnel, and sends an N4 session establishment request and/or modification request to a UPF corresponding to each group terminal device, where the N4 session establishment request and/or modification request includes a corresponding current multicast data forwarding policy.

In one embodiment, an N4 session establishment request and/or modification request is sent to the UPF corresponding to UE1, where the N4 session establishment request and/or modification request includes a corresponding current multicast data forwarding policy. A packet detection rule (PDR) in the N4 session establishment request and/or modification request includes device information, such as IP address, of UE1. A forwarding action rule (FAR) in the N4 session establishment request and/or modification request includes allowing it to forward multicast data. An N4 session establishment request and/or modification request is sent to the UPF corresponding to UE2, where the N4 session establishment request and/or modification request includes a corresponding current multicast data forwarding policy. The PDR in the N4 session establishment request and/or modification request includes the identification information of UE2, and the FAR in the N4 session establishment request and/or modification request includes discarding its multicast data. An N4 session establishment request and/or modification request is sent to the UPF corresponding to UE3, where the N4 session establishment request and/or modification request includes a corresponding current multicast data forwarding policy. The PDR in the N4 session establishment request and/or modification request includes the identification information of UE3, and the FAR in the N4 session establishment request and/or modification request includes discarding its multicast data.

Step 1004, UE1 sends a floor taken message to UE2.

Step 1005, UE1 sends a floor taken message to UE3.

Step 1006, the multicast data of UE1 is sent to the corresponding UPF, the UPF matches the multicast data with the corresponding current multicast data forwarding policy, and the multicast data is allowed to be forwarded normally. The multicast data of UE2 and UE3 is sent to the corresponding UPF, the UPF matches the multicast data with the current multicast data forwarding policy, and the multicast data is discarded.

The multicast data may be voice data.

In the method for floor control of the intra-group point-to-multipoint communication service provided by the embodiment, at an initial stage of determining the terminal device with the control right, the identification information of the target group and the identification information list of the group terminal device currently having the floor can be directly sent to the SMF by the service center, enabling the SMF to be aware of the identification information list of the group terminal device currently having the floor, and make the UPF update the multicast forwarding policy of each group terminal device in the target group according to the identification information list of the group terminal device currently having the floor, and then perform operations on multicast data according to the multicast forwarding policy, not only effectively preventing the group terminal device not having the floor from sending voice data maliciously, strengthening the control over sending of the voice data by the group terminal device not currently having the floor, but also allowing the identification information list of the group terminal device currently having the floor to be acquired without passing through the inter-satellite transmission tunnel. In the initial stage of determining the terminal device with the control right, the delay of acquiring the identification information list of the group terminal device currently having the floor is thus effectively reduced.

Figure 14:
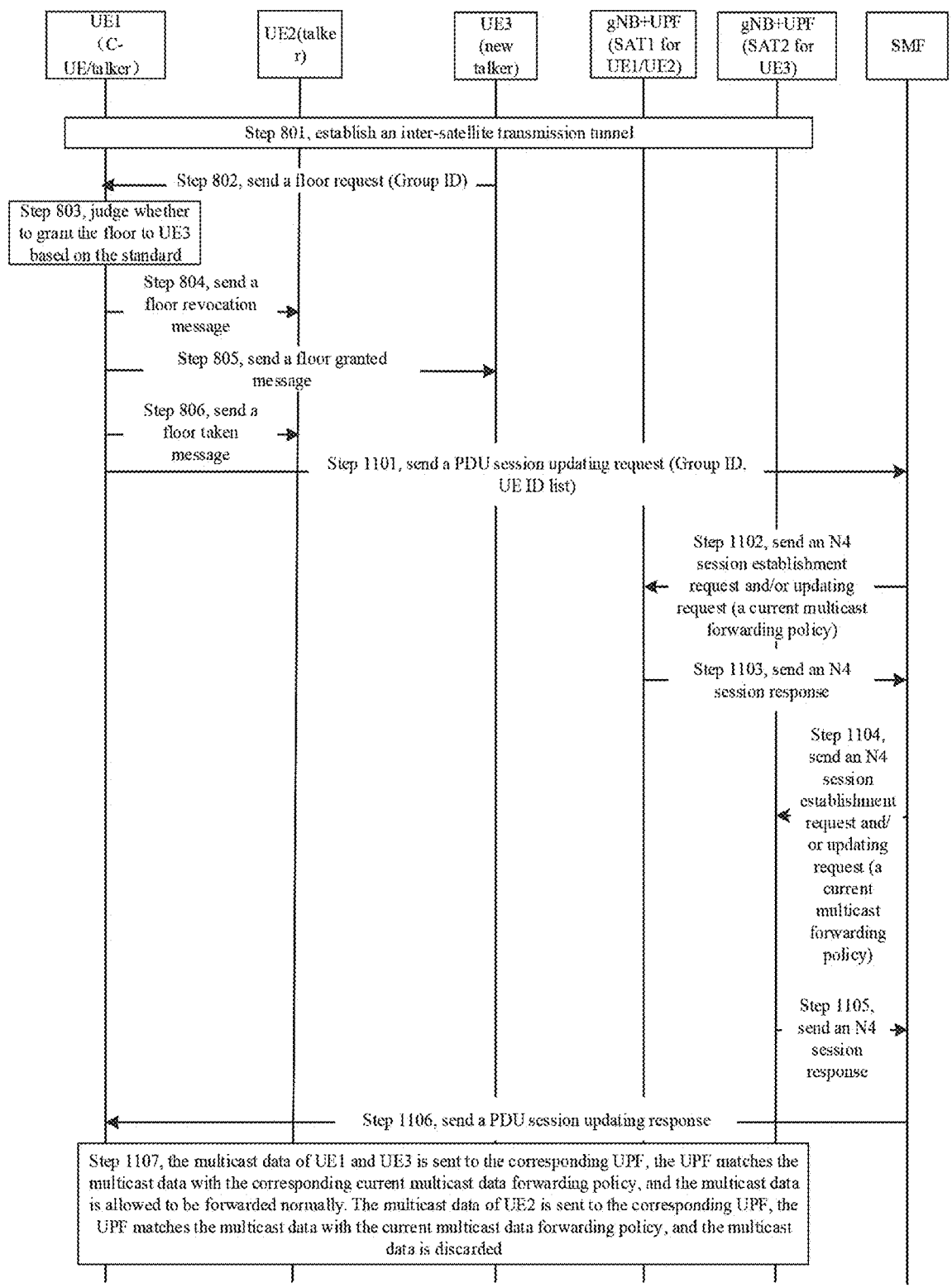
FIG. 14 is a schematic flowchart of signaling interaction of a method for floor control of an intra-group point-to-multipoint communication service provided by yet another embodiment of the present application.

FIG. 14 is a schematic flowchart of signaling interaction of a method for floor control of an intra-group point-to-multipoint communication service provided by still another embodiment of the present application. As shown in FIG. 14, the method for floor control of the intra-group point-to-multipoint communication service provided by the embodiment, based on the method for floor control of the intra-group point-to-multipoint communication service provided by the embodiments, involves an interaction process in a scenario that SMF acquires, after the terminal device with the control right performs the floor control operation, the identification information of the target group and the identification information list of the group terminal device currently having the floor. In the embodiment, take the terminal device with the control right being UE1 in the embodiments, and the terminal device currently having the floor being UE1 and UE2 as an example for illustration. The method for floor control of the intra-group point-to-multipoint communication service provided by an embodiment of the present application includes the following steps.

Step 1101, send a PDU session modification request to the SMF, where the PDU session modification request includes the identification information of the target group and the identification information list of the group terminal device currently having the floor. The identification information list of the group terminal device currently having the floor is referred to as: UE ID list for short.

In the embodiment, before step 1101, the terminal device with the control right determines the identification information list of the group terminal device currently having the floor. As in the embodiments, the terminal device with the control right determines that the identification information list of the group terminal device currently having the floor includes: identification information of UE1 and UE3.

It should be noted that, as shown in FIG. 14, before step 1101 is performed, step 801-step 806 are also performed. The specific implementation of step 801-step 806 is similar to that in the embodiments, which will not be repeated here.

It should be noted that, step 1101 is an implementation for the terminal device with the control right sending the identification information of the target group and the identification information list of the group terminal device currently having the floor to the SMF.

Correspondingly, the SMF receives the PDU session modification request sent by the terminal device with the control right, where the PDU session modification request includes the identification information of the target group and the identification information list of the group terminal device currently having the floor. As shown in FIG. 14, the identification information of UE1 and UE3 is included in the identification information list of the group terminal device currently having the floor included in the PDU session modification request.

Step 1102, the SMF sends an N4 session establishment request and/or modification request to the UPF corresponding to UE1 and UE2. The N4 session establishment request and/or modification request includes a corresponding current multicast data forwarding policy.

In the embodiment, as shown in FIG. 14, the UPF corresponding to UE1 and UE2 is the same UPF. The current multicast data forwarding policy, included in the N4 session establishment request and/or modification request sent to UE1, is allowing UE1 to forward the multicast data. The current multicast data forwarding policy, included in the N4 session establishment request and/or modification request sent to UE2, is discarding the multicast data of UE2.

Step 1103, the UPF corresponding to UE1 and UE2 sends an N4 session response to the SMF.

Step 1104, the SMF sends an N4 session establishment request and/or modification request to the UPF corresponding to UE3. The N4 session establishment request and/or modification request includes a corresponding current multicast data forwarding policy.

In the embodiment, the current multicast data forwarding policy, included in the N4 session establishment request and/or modification request sent to UE3, is allowing UE3 to forward the multicast data.

Step 1105, the UPF corresponding to UE3 sends an N4 session response to the SMF.

Step 1106, the SMF sends a PDU session updating response to UE1.

Step 1107, the multicast data of UE1 and UE3 is sent to the corresponding UPF, the UPF matches the multicast data with the corresponding current multicast data forwarding policy, and the multicast data is allowed to be forwarded normally. The multicast data of UE2 is sent to the corresponding UPF, and the UPF matches the multicast data with the current multicast data forwarding policy, and the multicast data is discarded.

In the method for floor control of the intra-group point-to-multipoint communication service provided by the embodiment, during performing the floor control operation by the terminal device with the control right, the identification information of the target group and the identification information list of the group terminal device currently having the floor can be sent from the terminal device with the control right to the SMF using the PDU session procedure, to make the SMF be aware of the identification information list of the group terminal device currently having the floor, and make the UPF update the multicast forwarding policy of each group terminal device in the target group according to the identification information list of the group terminal device currently having the floor, and then perform operations on multicast data according to the multicast forwarding policy. Therefore, the malicious transmission of voice data by the terminal device of the group terminal device currently not having the floor can be effectively prevented, the control PDU over sending of the voice data by the group terminal device not currently having the floor is strengthened.

Figure 15:
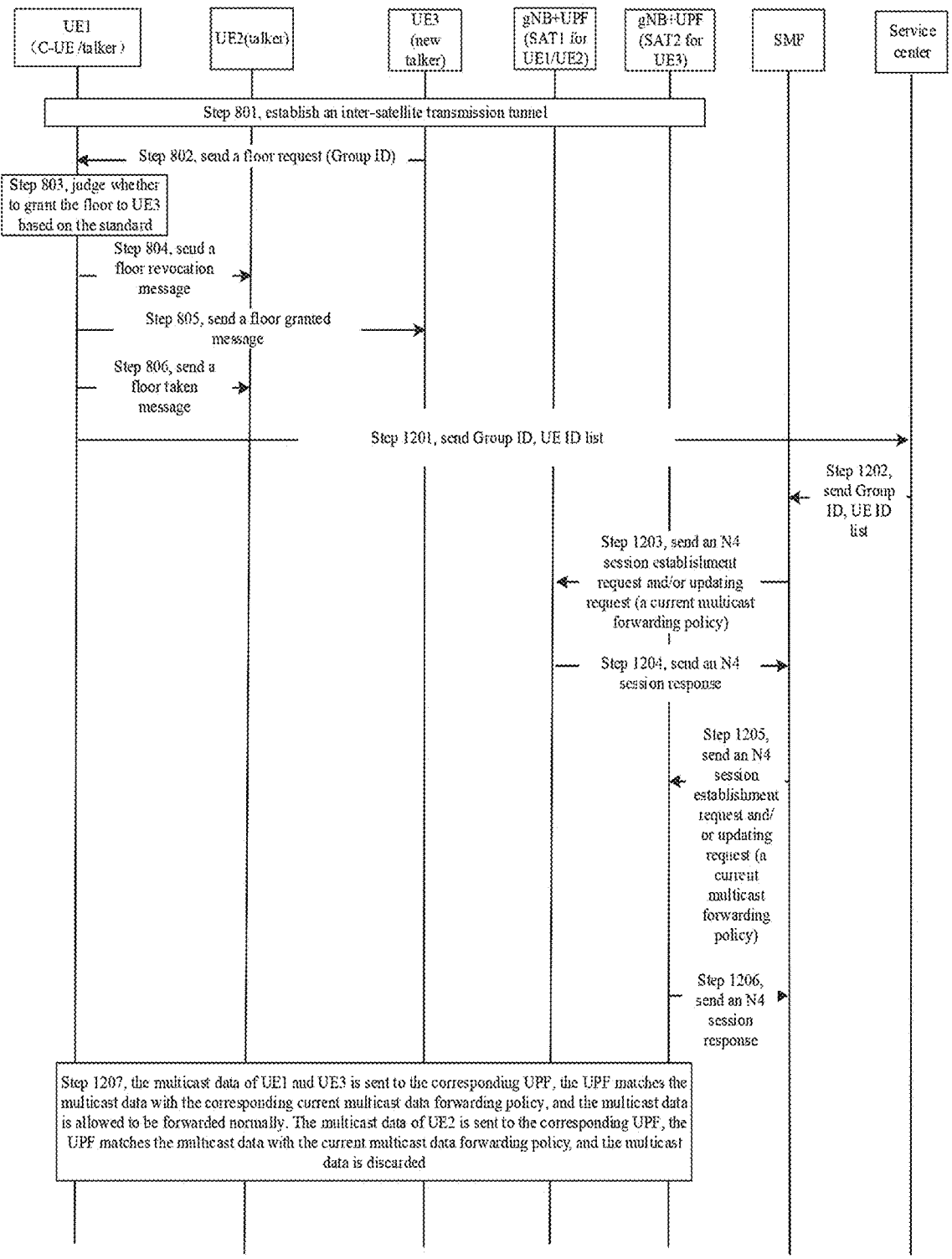
FIG. 15 is a schematic flowchart of signaling interaction of a method for floor control of an intra-group point-to-multipoint communication service provided by yet another embodiment of the present application.

FIG. 15 is a schematic flowchart of signaling interaction of a method for floor control of an intra-group point-to-multipoint communication service provided by still another embodiment of the present application. As shown in FIG. 15, the method for floor control of the intra-group point-to-multipoint communication service provided by the embodiment, based on the method for floor control of the intra-group point-to-multipoint communication service provided by the embodiments, involves an interaction process in a scenario that the SMF acquires, after the terminal device with the control right performs the floor control operation, the identification information of the target group and the identification information list of the group terminal device currently having the floor are. In the embodiment, take the terminal device with the control right being UE1 in the embodiments, and the terminal devices currently having the floor being UE1 and UE2 as an example for illustration. The method for floor control of the intra-group point-to-multipoint communication service provided by an embodiment of the present application includes the following steps.

Step 1201, the terminal device with the control right sends the identification information of the target group and the identification information list of the group terminal device currently having the floor to the service center.

Correspondingly, the service center receives the identification information list of the group terminal device currently having the floor sent by the terminal device with the control right.

As shown in FIG. 15, before step 1201 is performed, step 801-step 806 are also performed. The specific implementation of step 801-step 806 is similar to that in the embodiments, which will not be repeated here. The identification information list of the group terminal device currently having the floor, sent to the service center by the terminal device with the control right, includes: identification information of UE1 and UE3.

Step 1202, the service center sends the identification information of the target group and the identification information list of the group terminal device currently having the floor to the SMF.

Step 1203, the SMF sends an N4 session establishment request and/or modification request to the UPF corresponding to UE1 and UE2. The N4 session establishment request and/or modification request includes a corresponding current multicast data forwarding policy.

In the embodiment, as shown in FIG. 14, the UPF corresponding to UE1 and UE2 is the same UPF. The current multicast data forwarding policy, included in the N4 session establishment request and/or modification request sent to UE1, is allowing UE1 to forward the multicast data. The current multicast data forwarding policy, included in the N4 session establishment request and/or modification request sent to UE2, is discarding the multicast data of UE2.

Step 1204, the UPF corresponding to UE1 and UE2 sends an N4 session response to the SMF.

Step 1205, the SMF sends an N4 session establishment request and/or modification request to the UPF corresponding to UE3. The N4 session establishment request and/or modification request includes a corresponding current multicast data forwarding policy.

In the embodiment, the current multicast data forwarding policy, included in the N4 session establishment request and/or modification request sent to the UPF corresponding to UE3, is allowing UE3 to forward the multicast data.

Step 1206, the UPF corresponding to UE3 sends an N4 session response to the SMF.

In this embodiment, the implementation of step 1203-step 1206 is similar to the implementation of step 1102-step 1105 in the embodiments, which will not be repeated here.

Step 1207, the multicast data of UE1 and UE3 is sent to the corresponding UPF, the UPF matches the multicast data with the corresponding current multicast data forwarding policy, and the multicast data is allowed to be forwarded normally. The multicast data of UE2 is sent to the corresponding UPF, and the UPF matches the multicast data with the current multicast data forwarding policy, and the multicast data is discarded.

In the embodiment, the implementation of step 1207 is similar to that of the step 1107 in the embodiments, which will not be repeated here.

In the method for floor control of the intra-group point-to-multipoint communication service provided by the embodiment, during performing the floor control operation by the terminal device with the control right, the terminal device with the control right can notify the identification information of the target group and the identification information list of the group terminal device currently having the floor to the service center of the target group through the user plane, and the identification information of the target group and the identification information list of the group terminal device currently having the floor is sent to the SMF by the service center, enabling the SMF to be aware of the identification information list of the group terminal device currently having the floor, and make the UPF update the multicast forwarding policy of each group terminal device in the target group according to the identification information list of the group terminal device currently having the floor, and then perform operations on multicast data according to the multicast forwarding policy. Therefore, the malicious transmission of voice data by the terminal device of the group terminal device currently not having the floor can be effectively prevented, the control service over sending of the voice data by the group terminal device not currently having the floor is strengthened, and a uniform control by the service center can be achieved at the same time.

Figure 16:
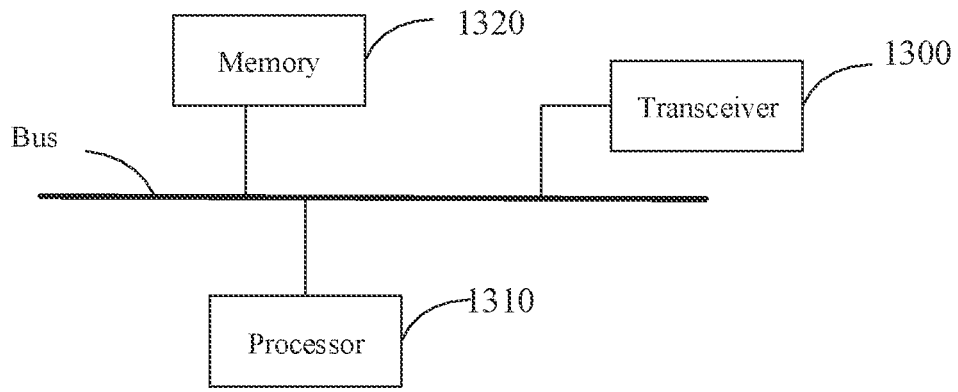
FIG. 16 is a schematic structural diagram of an apparatus for floor control of an intra-group point-to-multipoint communication service provided by still another embodiment of the present application.

FIG. 16 is a schematic structural diagram of an apparatus for floor control of an intra-group point-to-multipoint communication service provided by still another embodiment of the present application. As shown in FIG. 16, the apparatus for floor control of an intra-group point-to-multipoint communication service is located in a service center. The apparatus for floor control of the intra-group point-to-multipoint communication service provided by the embodiment includes: a transceiver 1300 configured to receive and send data under control of a processor 1310.

In FIG. 16, the bus architecture may include any number of interconnected buses and bridges, and is of various circuits linked together of one or more processors represented by the processor 1310 and one or more memories represented by a memory 1320. The bus architecture may be also used to link various other circuits together, such as peripherals, voltage regulators, and power management circuits, which are well known in the art and therefore will not be further described herein. The bus interface provides an interface. The transceiver 1300 may be multiple elements, that is, including a transmitter and a receiver, and provides a device for communicating with various other apparatuses over a transmission medium, which includes a transmission medium such as a wireless channel, a wired channel, a fiber optic cable, etc. The processor 1310 is responsible for managing the bus architecture and usual processing, and the memory 1320 can store data used by the processor 1310 when performing operations.

The processor 1310 may be a central processing unit (CPU), an application specific integrated circuit (ASIC), a field-programmable gate array (FPGA), or a complex programmable logic device (CPLD). The processor may also have a multi-core architecture.

In the embodiment, the memory 1320 is configured to store a computer program; the transceiver 1300 is configured to send and receive data under control of the processor; and the processor 1310 is configured to read the computer program in the memory and execute following operations:

receiving a group call request sent by a first group terminal device in a target group, where the group call request includes identification information of the target group; determining, according to the identification information of the target group and a mapping relationship established in advance between identification information of each group and identification information of a terminal device with a control right, a terminal device with the control right corresponding to the target group; sending identification information of the terminal device with the control right to other group terminal devices in the target group, to make the other group terminal devices request floor from the terminal device with the control right; sending the identification information of the target group and a control right role indication to the terminal device with the control right, to make the terminal device with the control right perform a floor control operation on a group terminal device in the corresponding target group.

In one embodiment, before the processor 1310 is configured to determine, according to the identification information of the target group and the mapping relationship established in advance between the identification information of each group and the identification information of the terminal device with the control right, the terminal device with the control right corresponding to the target group, the operations further include:

setting a terminal device with the control right for each group according to a service policy; establishing the mapping relationship between the identification information of each group and the identification information of the corresponding terminal device with the control right.

In one embodiment, the terminal device with the control right corresponding to the target group is the first group terminal device;

correspondingly, when the processor 1310 is configured to send the identification information of the terminal device with the control right to the other group terminal devices in the target group, to make the other group terminal devices request the floor from the terminal device with the control right, the operations include:
sending a group call request to a second group terminal device in the target group, where the group call request includes identification information of the first group terminal device, to make the second group terminal device request the floor from the first group terminal device, where the second group terminal device is a terminal device in the target group other than the first group terminal device;

when the processor 1310 is configured to send the identification information of the target group and the control right role indication to the terminal device with the control right, to make the terminal device with the control right perform the floor control operation on the group terminal device in the corresponding target group, the operations include:
sending a group call response to the first group terminal device, where the group call response includes the identification information of the target group and the control right role indication, to make the first group terminal device perform the floor control operation on the group terminal device in the corresponding target group.

In one embodiment, the terminal device with the control right corresponding to the target group is a third group terminal device in the target group;

correspondingly, when the processor 1310 is configured to send the identification information of the terminal device with the control right to the other group terminal devices in the target group, to make the other group terminal devices request the floor from the terminal device with the control right, the operations include:
sending a group call request to a second group terminal device in the target group except the third group terminal device, where the group call request includes identification information of the third group terminal device, to make the second group terminal device other than the third group terminal device request the floor from the third group terminal device, where the second group terminal device is a terminal device in the target group other than the first group terminal device; sending a group call response to the first group terminal device, where the group call response includes the identification information of the third group terminal device, to make the first group terminal device request the floor from the third group terminal device;

when the processor 1310 is configured to send the identification information of the target group and the control right role indication to the terminal device with the control right, to make the terminal device with the control right perform the floor control operation on the group terminal device in the corresponding target group, the operations include:
sending a group call request to the third group terminal device, where the group call request includes the identification information of the target group and the control right role indication, to make the third group terminal device perform the floor control operation on the group terminal device in the corresponding target group.

In one embodiment, the terminal device with the control right corresponding to the target group is a terminal device outside the target group;

correspondingly, when the processor 1310 is configured to send the identification information of the terminal device with the control right to the other group terminal devices in the target group, to make the other group terminal devices request the floor from the terminal device with the control right, the operations include:

sending a group call request to a second group terminal device in the target group, where the group call request includes identification information of the terminal device outside the target group, to make the second group terminal device request the floor from the terminal device outside the target group, where the second group terminal device is a terminal device in the target group other than the first group terminal device; sending a group call response to the first group terminal device, where the group call response includes the identification information of the terminal device outside the target group, to make the first group terminal device request the floor from the terminal device outside the target group;

when the processor 1310 is configured to send the identification information of the target group and the control right role indication to the terminal device with the control right, to make the terminal device with the control right perform the floor control operation on the group terminal device in the corresponding target group, the operations include:

sending a floor notification message to the terminal device outside the target group, where the floor notification message includes the identification information of the target group and the control right role indication, to make the terminal device outside the target group perform the floor control operation on the group terminal device in the corresponding target group.

In one embodiment, after the processor 1310 is configured to send the control right role indication to the terminal device with the control right, to make the terminal device with the control right perform the floor control operation, the operations further include:

acquiring a identification information list of a group terminal device currently having the floor; sending the identification information of the target group and the identification information list of the group terminal device currently having the floor to an SMF, to make the SMF determine a current multicast data forwarding policy corresponding to each group terminal device in the target group according to the identification information of the target group and the identification information list of the group terminal device currently having the floor, and sending the current multicast data forwarding policy to a UPF corresponding to the group terminal device.

In one embodiment, when the processor 1310 is configured to acquire the identification information list of the group terminal device currently having the floor, the operations include:

receiving the identification information list of the group terminal device currently having the floor sent by the terminal device with the control right.

It should be noted herein that, the above apparatus provided in the present application is capable of implementing all the method steps achieved by the corresponding method embodiment, and is capable of achieving the same effect, and the same parts and beneficial effects of the present embodiment as those in the method embodiment will not be described in detail herein.

Figure 17:
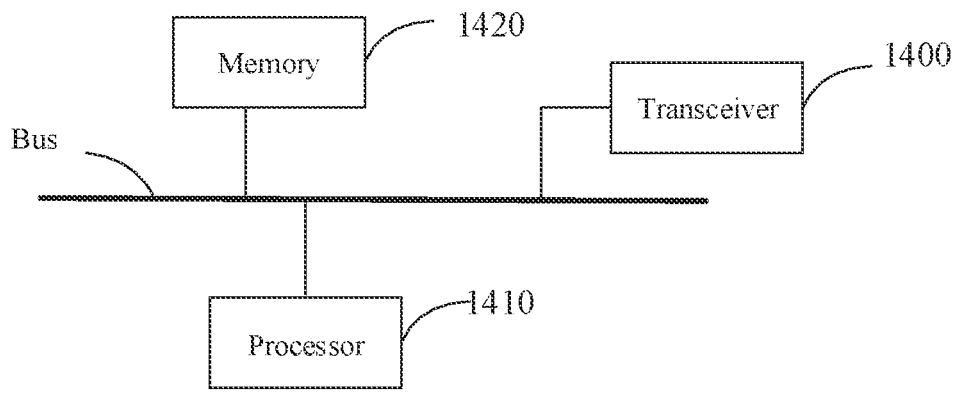
FIG. 17 is a schematic structural diagram of an apparatus for floor control of an intra-group point-to-multipoint communication service provided by another embodiment of the present application.

FIG. 17 is a schematic structural diagram of an apparatus for floor control of an intra-group point-to-multipoint communication service provided by another embodiment of the present application. As shown in FIG. 17, the apparatus for floor control of the intra-group point-to-multipoint communication service provided by another embodiment of the present application is located in a terminal device with a control right. The apparatus for floor control of the intra-group point-to-multipoint communication service provided by the embodiment includes: a transceiver 1400 configured to receive and send data under control of a processor 1410.

In FIG. 17, the bus architecture may include any number of interconnected buses and bridges, and are of various circuits linked together of one or more processors represented by the processor 1410 and one or more memories represented by a memory 1420. The bus architecture may be also used to link various other circuits together, such as peripherals, voltage regulators, and power management circuits, which are well known in the art and therefore will not be further described herein. The bus interface provides an interface. The transceiver 1400 may be multiple elements, that is, including a transmitter and a receiver, and provides a device for communicating with various other apparatuses over a transmission medium, which includes a transmission medium such as a wireless channel, a wired channel, a fiber optic cable, etc. For different user devices, a user interface 1430 may also be an interface capable of connecting externally and internally to a required device, and the connected device includes but not limited to a keypad, a displayer, a speaker, a microphone, a joystick, and the like.

The processor 1410 is responsible for managing the bus architecture and usual processing, and the memory 1420 can store data used by the processor 1410 when performing operations.

The processor 1410 may be a CPU (central processing unit), an ASIC (Application Specific Integrated Circuit), a FPGA (Field-Programmable Gate Array), or a CPLD (Complex Programmable Logic Device). The processor may also have a multi-core architecture.

The processor is configured to execute any method provided in the embodiment of the present application according to the obtained executable instruction by calling a computer program stored in the memory. The processor and the memory may also be physically separately arranged.

In the embodiment, the memory 1420 is configured to store a computer program; the transceiver 1400 is configured to send and receive data under control of the processor 1410; and the processor 1410 is configured to read the computer program in the memory and execute following operations:

receiving identification information of a target group and a control right role indication sent by a service center; determining, according to the identification information of the target group and the control right role indication, itself as a terminal device with a control right of the corresponding target group; performing a floor control operation on a group terminal device in the corresponding target group.

In one embodiment, the terminal device with the control right is a first group terminal device in the corresponding target group; correspondingly, when the processor 1410 receives the identification information of the target group and the control right role indication sent by the service center, the operations include: receiving a group call response sent by the service center, where the group call response includes the identification information of the target group and the control right role indication;

- or, the terminal device with the control right is a third group terminal device in the corresponding target group, and the third group terminal device is any terminal device of second group terminal device in the target group other than the first group terminal device; correspondingly, when the processor 1410 receives the identification information of the target group and the control right role indication sent by the service center, the operations include: receiving a group call request sent by the service center, where the group call request includes the identification information of the target group and the control right role indication;
- or, the terminal device with the control right is a terminal device outside the target group; correspondingly, when the processor 1410 receives identification information of the target group and the control right role indication sent by the service center, the operations include:
- receiving a floor notification message sent by the service center, where the floor notification message includes the identification information of the target group and the control right role indication.

In one embodiment, when the processor 1410 performs the floor control operation on the group terminal device in the corresponding target group, the operations include:

- determining whether a floor request sent by a certain group terminal device in the corresponding target group is received; if it is determined that the floor request sent by the certain group terminal device is received, determining whether to grant the floor to the group terminal device according to the floor request; if it is determined that the group terminal device is granted the floor, sending a floor granted message to the group terminal device and sending a floor taken message to other group terminal devices in the target group except the group terminal.

In one embodiment, after the processor 1410 performs the floor control operation on the group terminal device in the corresponding target group, the operations further include:

- determining an identification information list of a group terminal device currently having the floor; sending the identification information of the target group and the identification information list of the group terminal device currently having the floor to the service center or an SMF.

In one embodiment, when the processor 1410 sends the identification information of the target group and the identification information list of the group terminal device currently having the floor to the SMF, the operations include:

- sending a PDU session modification request to the SMF, where the PDU session modification request includes the identification information of the target group and the identification information list of the group terminal device currently having the floor.

It should be noted herein that, the above apparatus provided in the present application is capable of implementing all the method steps achieved by the corresponding method embodiment, and is capable of achieving the same effect, and the same parts and beneficial effects of the present embodiment as those in the method embodiment will not be described in detail herein.

Figure 18:
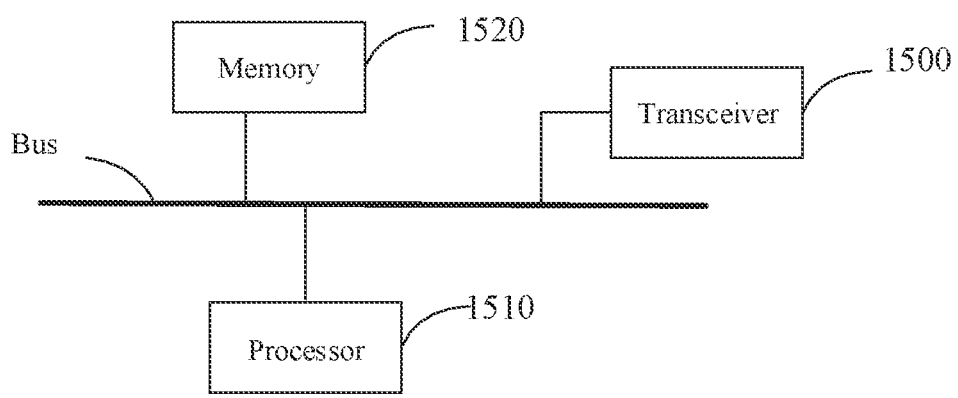
FIG. 18 is a schematic structural diagram of an apparatus for floor control of an intra-group point-to-multipoint communication service provided by still another embodiment of the present application.

FIG. 18 is a schematic structural diagram of an apparatus for floor control of an intra-group point-to-multipoint communication service provided by still another embodiment of the present application. As shown in FIG. 18, the apparatus for floor control of the intra-group point-to-multipoint communication service provided the embodiment is located in an SMF. The apparatus for floor control of the intra-group point-to-multipoint communication service provided by the embodiment includes: a transceiver 1500 configured to receive and send data under control of a processor 1510.

In FIG. 18, the bus architecture may include any number of interconnected buses and bridges, and are of various circuits linked together of one or more processors represented by the processor 1510 and one or more memories represented by a memory 1520. The bus architecture may also be used to link various other circuits together, such as peripherals, voltage regulators, and power management circuits, which are well known in the art and therefore will not be further described herein. The bus interface provides an interface. The transceiver 1500 may be multiple elements, that is, including a transmitter and a receiver, and provides a device for communicating with various other apparatuses over a transmission medium, which includes a transmission medium such as a wireless channel, a wired channel, a fiber optic cable, etc. For different user devices, a user interface 1530 may also be an interface capable of connecting externally and internally to a required device, and the connected device includes but not limited to a keypad, a displayer, a speaker, a microphone, a joystick, and the like.

The processor 1510 is responsible for managing the bus architecture and usual processing, and the memory 1520 may store data used by the processor 1510 when performing operations.

The processor 1510 may be a CPU (central processing unit), an ASIC, a FPGA, or a CPLD. The processor may also have a multi-core architecture.

The processor is configured to execute any method provided in the embodiment of the present application according to the obtained executable instruction by calling a computer program stored in the memory. The processor and the memory may also be physically separately arranged.

In the embodiment, the memory 1520 is configured to store a computer program; the transceiver 1500 is configured to send and receive data under control of the processor 1510; and the processor 1510 is configured to read the computer program in the memory and execute following operations:

- acquiring identification information of a target group and an identification information list of a group terminal device currently having the floor, where the identification information list of the group terminal device currently having the floor is determined by a service center, or the identification information list of the group terminal device currently having the floor is determined by a terminal device with a control right corresponding to the target group, after the terminal device with the control right corresponding to the target group determines, according to the identification information of the target group and a control right role indication, itself as the terminal device with the control right in the corresponding target group to perform a floor control operation on a group terminal device in the target group, where the control right role indication is sent by the service center to the terminal device with the control right; determining a current multicast data forwarding policy corresponding to each group terminal device in the target group according to the identification information of the target group and the identification information list of the group terminal device currently having the floor; sending the current multicast data forwarding policy to a UPF corresponding to the group terminal device, to make the UPF, after receiving multicast data sent by the corresponding group terminal device, perform forwarding or discarding operation on the multicast data according to the corresponding current multicast data forwarding policy.

In one embodiment, when the processor 1510 is configured to acquire the identification information of the target group and the identification information list of the group terminal device currently having the floor, the operations include:

receiving the identification information of the target group and the identification information list of the group terminal device currently having the floor sent by the service center or the terminal device with the control right.

In one embodiment, when the processor 1510 receives the identification information of the target group and the identification information list of the group terminal device currently having the floor sent by the terminal device with the control right, the operations include:

receiving a PDU session modification request sent by the terminal device with the control right, where the PDU session modification request includes the identification information of the target group and the identification information list of the group terminal device currently having the floor.

In one embodiment, when the processor 1510 determines the current multicast data forwarding policy corresponding to each group terminal device in the target group according to the identification information of the target group and the identification information list of the group terminal device currently having the floor, the operations include:

determining, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device not currently having the floor.

In one embodiment, the processor 1510 sends the current multicast data forwarding policy to the UPF corresponding to the group terminal device, the operations include:

sending an N4 session establishment request and/or modification request to a UPF corresponding to each group terminal device, where the N4 session establishment request and/or modification request includes the corresponding current multicast data forwarding policy.

It should be noted herein that, the above apparatus provided in the present application is capable of implementing all the method steps achieved by the corresponding method embodiment, and is capable of achieving the same effect, and the same parts and beneficial effects of the present embodiment as those in the method embodiment will not be described in detail herein.

Figure 19:
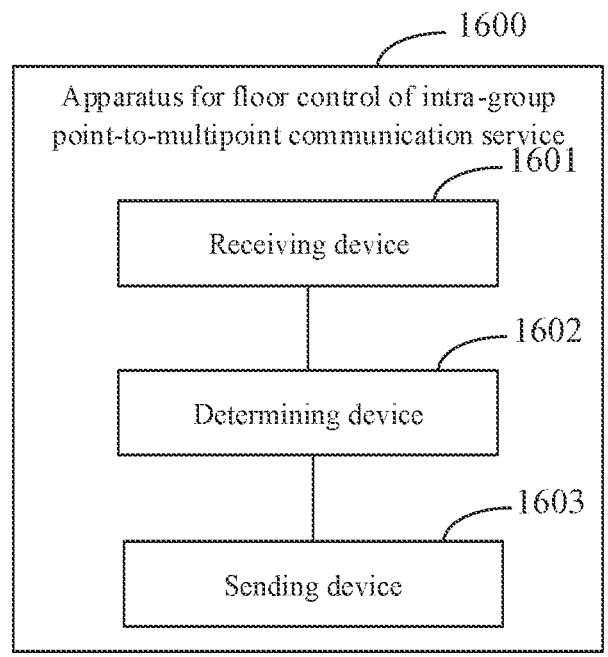
FIG. 19 is a schematic structural diagram of an apparatus for floor control of an intra-group point-to-multipoint communication service provided by yet another embodiment of the present application.

FIG. 19 is a schematic structural diagram of an apparatus for floor control of an intra-group point-to-multipoint communication service provided by yet another embodiment of the present application. As shown in FIG. 19, the apparatus for floor control of the intra-group point-to-multipoint communication service is located in a service center. An apparatus 1600 for floor control of the intra-group point-to-multipoint communication service includes: a receiving device 1601, a determining device 1602, and a sending device 1603.

The receiving device 1601 is configured to receive a group call request sent by a first group terminal device in a target group, where the group call request includes identification information of the target group. The determining device 1602 is configured to determine, according to the identification information of the target group and a mapping relationship established in advance between identification information of each group and identification information of a terminal device with a control right, a terminal device with the control right corresponding to the target group. The sending device 1603 is configured to send identification information of the terminal device with the control right to other group terminal devices in the target group, to make the other group terminal devices request floor from the terminal device with the control right. The sending device 1603 is further configured to send the identification information of the target group and a control right role indication to the terminal device with the control right, to make the terminal device with the control right perform a floor control operation on a group terminal device in the corresponding target group.

In one embodiment, the apparatus 1600 for floor control of the intra-group point-to-multipoint communication service provided by the embodiment further includes: an establishing device, configured to, before the determining device determines, according to the identification information of the target group and the mapping relationship established in advance between the identification information of each group and the identification information of the terminal device with the control right, the terminal device with the control right corresponding to the target group, set, according to a service policy, a terminal device with the control right for each group; establish the mapping relationship between the identification information of each group and the identification information of the corresponding terminal device with the control right.

In one embodiment, the terminal device with the control right corresponding to the target group is the first group terminal device; the sending device 1603, when sending the identification information of other terminal devices with the control right to the group terminal device in the target group, to make other group terminal devices request the floor from the terminal device with the control right, is configured to: send a group call request to a second group terminal device in the target group, where the group call request includes identification information of the first group terminal device, to make the second group terminal device request the floor from the first group terminal device, where the second group terminal device is a terminal device in the target group other than the first group terminal device; the sending device 1603, when sending the identification information of the target group and the control right role indication to the terminal device with the control right, to make the terminal device with the control right perform the floor control operation on the group terminal device in the corresponding target group, is configured to: send a group call response to the first group terminal device, where the group call response includes the identification information of the target group and the control right role indication, to make the first group terminal device perform the floor control operation on the group terminal device in the corresponding target group.

In one embodiment, the terminal device with the control right corresponding to the target group is a third group terminal device in the target group; the sending device 1603, when sending the identification information of the terminal device with the control right to the other group terminal devices in the target group, to make the other group terminal devices request the floor from the terminal device with the control right, is configured to: send a group call request to a second group terminal device in the target group except the third group terminal device, where the group call request includes identification information of the third group terminal device, to make the second group terminal device other than the third group terminal device request the floor from the third group terminal device, where the second group terminal device is a terminal device in the target group other than the first group terminal device; send a group call response to the first group terminal device, where the group call response includes the identification information of the third group terminal device, to make the first group terminal device request the floor from the third group terminal device; the sending device 1603, when sending the identification information of the target group and the control right role indication to the terminal device with the control right, to make the terminal device with the control right perform the floor control operation on the group terminal device in the corresponding target group, is configured to: send a group call request to the third group terminal device, where the group call request includes the identification information of the target group and the control right role indication, to make the third group terminal device perform the floor control operation on the group terminal device in the corresponding target group.

In one embodiment, the terminal device with the control right corresponding to the target group is a terminal device outside the target group; correspondingly, the sending device 1603, when sending the identification information of the terminal device with the control right to the other group terminal devices in the target group, to make the other group terminal devices request the floor from the terminal device with the control right, is configured to: send a group call request to a second group terminal device in the target group, where the group call request includes identification information of the terminal device outside the target group, to make the second group terminal device request the floor from the terminal device outside the target group, where the second group terminal device is a terminal device in the target group other than the first group terminal device; send a group call response to the first group terminal device, where the group call response includes the identification information of the terminal device outside the target group, to make the first group terminal device request the floor from the terminal device outside the target group; the sending device 1603, when sending the identification information of the target group and the control right role indication to the terminal device with the control right, to make the terminal device with the control right perform the floor control operation on the group terminal device in the corresponding target group, is configured to: send a floor notification message to the terminal device outside the target group, where the floor notification message includes the identification information of the target group and the control right role indication, to make the terminal device outside the target group perform the floor control operation on the group terminal device in the corresponding target group.

In one embodiment, the apparatus 1600 for floor control of the intra-group point-to-multipoint communication service provided by the embodiment further includes: an acquiring device. The acquiring device is configured to acquire an identification information list of a group terminal device currently having the floor. The sending device 1603 is configured to send the identification information of the target group and the identification information list of the group terminal device currently having the floor to a SMF, to make the SMF determine a current multicast data forwarding policy corresponding to each group terminal device in the target group according to the identification information of the target group and the identification information list of the group terminal device currently having the floor, and send the current multicast data forwarding policy to a UPF corresponding to the group terminal device.

In one embodiment, the acquiring device is configured to: receive the identification information list of the group terminal device currently having the floor sent by the terminal device with the control right.

In the embodiment, the method and the apparatus are based on the same application concept. Since the method and the apparatus solve the problem with similar principles, reference can be made to each other for the implementation of the apparatus and the method, and the repetition is not made.

Figure 20:
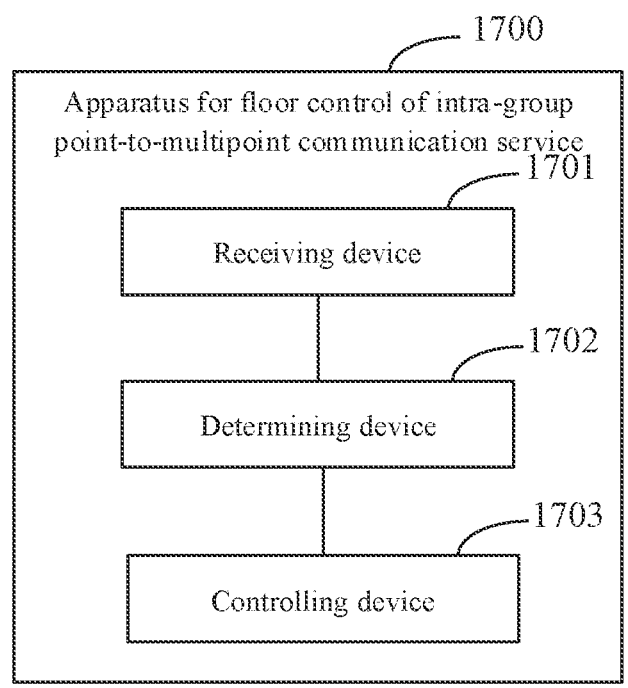
FIG. 20 is a schematic structural diagram of an apparatus for floor control of an intra-group point-to-multipoint communication service provided by yet another embodiment of the present application.

FIG. 20 is a schematic structural diagram of an apparatus for floor control of an intra-group point-to-multipoint communication service provided by yet another embodiment of the present application. As shown in FIG. 20, the apparatus for floor control of the intra-group point-to-multipoint communication service provided by another embodiment of the present application is located in a terminal device with a control right. An apparatus 1700 for floor control of the intra-group point-to-multipoint communication service includes: a receiving device 1701, a determining device 1702, and a controlling device 1703.

The receiving device 1701 is configured to receive identification information of a target group and a control right role indication sent by a service center. The determining device 1702 is configured to determine, according to the identification information of the target group and the control right role indication, itself as a terminal device with a control right in the corresponding target group. The controlling device 1703 is configured to perform a floor control operation on a group terminal device in the corresponding target group.

In one embodiment, the terminal device with the control right is a first group terminal device in the corresponding target group. Correspondingly, the receiving device 1701 is configured to: receive a group call response sent by the service center, where the group call response includes the identification information of the target group and the control right role indication. In one embodiment, the terminal device with the control right is a third group terminal device in the corresponding target group, and the third group terminal device is any of a second group terminal device in the target group other than the first group terminal device. Correspondingly, the receiving device 1701 is configured to: receive a group call request sent by the service center, where the group call request includes the target group identification information and the control right role indication. In one embodiment, the terminal device with the control right is a terminal device outside the target group, and correspondingly, the receiving device 1701 is configured to: receive a floor notification message sent by the service center, where the floor notification message includes the identification information of the target group and the control right role indication.

In one embodiment, the controlling device 1703 is configured to: determine whether a floor request sent by a certain group terminal device in the corresponding target group is received; if it is determined that the floor request sent by the certain group terminal device is received, determine whether to grant the floor to the group terminal device according to the floor request; if it is determined that the group terminal device is granted the floor, send a floor granted message to the group terminal device and send a floor taken message to other group terminal devices in the target group except the group terminal.

In one embodiment, the apparatus 1700 for floor control of the intra-group point-to-multipoint communication service provided by the embodiment further includes: a sending device.

The determining device 1702 is configured to determine an identification information list of a group terminal device currently having the floor. The sending device is configured to send the identification information of the target group and the identification information list of the group terminal device currently having the floor to the service center or an SMF.

In one embodiment, the sending device, when sending the identification information of the target group and the identification information list of the group terminal device currently having the floor to the SMF, is configured to: send a unit PDU session modification request to the SMF, where the PDU session modification request includes the identification information of the target group and the identification information list of the group terminal device currently having the floor.

The method and the apparatus are based on the same application concept. Since the method and the apparatus solve the problem with similar principles, reference can be made to each other for the implementation of the apparatus and the method, and the repetition is not made.

Figure 21:
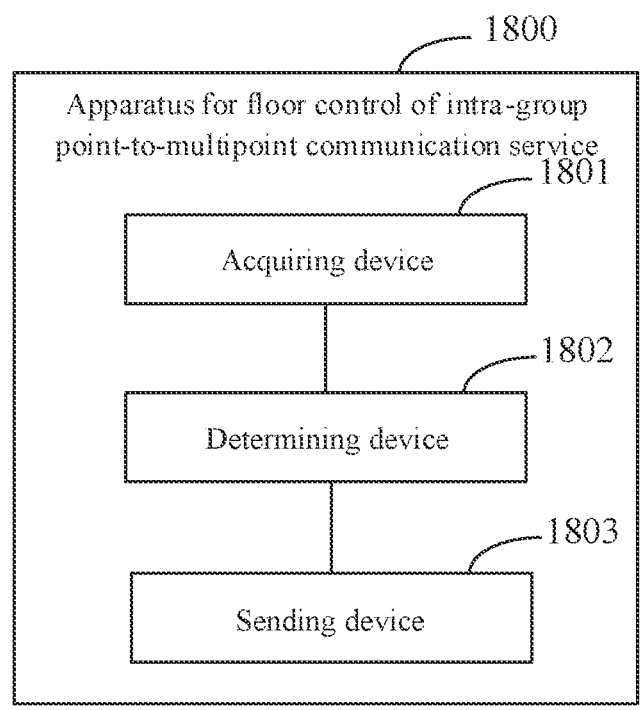
FIG. 21 is a schematic structural diagram of an apparatus for floor control of an intra-group point-to-multipoint communication service provided by yet another embodiment of the present application.

FIG. 21 is a schematic structural diagram of an apparatus for floor control of an intra-group point-to-multipoint communication service provided by yet another embodiment of the present application. As shown in FIG. 21, the apparatus for floor control of the intra-group point-to-multipoint communication service is located in an SMF. An apparatus 1800 for floor control of the intra-group point-to-multipoint communication service provided by this embodiment includes: an acquiring device 1801, a determining device 1802, and a sending device 1803.

The acquiring device 1801 is configured to acquire identification information of a target group and an identification information list of a group terminal device currently having the floor, where the identification information list of the group terminal device currently having the floor is determined by a service center, or the identification information list of the group terminal device currently having the floor is determined by a terminal device with a control right corresponding to the target group, after the terminal device with the control right corresponding to the target group determines, according to the identification information of the target group and a control right role indication, itself as the terminal device with the control right in the corresponding target group to perform a floor control operation on a group terminal device in the target group, where the control right role indication is sent by the service center to the terminal device with the control right. The determining device 1802 is configured to determine a current multicast data forwarding policy corresponding to each group terminal device in the target group according to the identification information of the target group and the identification information list of the group terminal device currently having the floor. The sending device 1803 is configured to send the current multicast data forwarding policy to a UPF corresponding to the group terminal device, to make the UPF, after receiving multicast data sent by the corresponding group terminal device, perform forwarding or discarding operation on the multicast data according to the corresponding current multicast data forwarding policy.

In one embodiment, the acquiring device 1801 is configured to: receive the identification information of the target group and the identification information list of the group terminal device currently having the floor sent by the service center or the terminal device with the control right.

In one embodiment, the acquiring device 1801, when receiving the identification information of the target group and the identification information list of the group terminal device currently having the floor sent by the terminal device with the control right, is configured to: receive a PDU session modification request sent by the terminal device with the control right, where the PDU session modification request includes the identification information of the target group and the identification information list of the group terminal device currently having the floor.

In one embodiment, the determining device 1802 is configured to: determine, according to the identification information of the target group and the identification information list of the group terminal device currently having the floor, that the multicast data forwarding policy of the group terminal device currently having the floor in the target group is allowing the group terminal device currently having the floor to forward multicast data, and that the multicast data forwarding policy of a group terminal device currently not having the floor in the target group is discarding multicast data of the group terminal device not currently having the floor.

In one embodiment, the sending device is configured to: send an N4 session establishment request and/or modification request to a UPF corresponding to each group terminal device, where the N4 session establishment request and/or modification request includes the corresponding current multicast data forwarding policy.

The method and the apparatus are based on the same application concept. Since the method and the apparatus solve the problem with similar principles, reference can be made to each other for the implementation of the apparatus and the method, and the repetition is not made.

It should be noted that, the division of devices in the embodiment of the present application is schematic, and is only a logical function division, and there may be other division manners in actual implementation. In addition, each functional device in each embodiment of the present application may be integrated in a single processing device, or each device may be physically present separately, or two or more devices may be integrated in a single device. The above integrated devices can be implemented either in the form of hardware or in the form of software functional units.

The integrated units may be stored in a processor-readable storage medium when implemented in the form of software function units and sold or used as an independent product. Based on this understanding, the embodiments of the present application is essentially, or the part which makes contribution to the prior art, or all or part of the embodiments can be embodied in the form of a software product. The computer software product may be stored in a storage medium, including several instructions for enabling a computer device (which may be a personal computer, a server, or a network device, etc.) or a processor to execute all or part of the steps of the methods in the various embodiments of the present application. The aforementioned storage media includes: a U disk, a mobile hard disk, a read-only memory (ROM), a random access memory (RAM), a magnetic disk or an optical disk and other medium that can store program codes.

One embodiment of the present application provides a processor-readable storage medium, where the processor-readable storage medium has a computer program stored thereon, and the computer program is used to cause the processor to execute the method for floor control of the intra-group point-to-multipoint communication service provided by provided by any one of the embodiments.

The processor-readable storage medium may be any available medium or data storage device that can be accessed by the processor, including but not limited to a magnetic storage (such as a floppy disk, a hard disk, a magnetic tape, a magneto-optical disk (MO), etc.), an optical storage (such as CD, DVD, BD, HVD, etc.), and a semiconductor storage (such as ROM, EPROM, EEPROM, a non-volatile memory (NAND FLASH), a solid state disk (SSD)), etc.

Embodiments of the present application may be provided as methods, systems, or computer program products. Accordingly, the present application may take the form of an entirely hardware embodiment, an entirely software embodiment or an embodiment combining software and hardware aspects. The present application may take the form of a computer program product embodied on one or more computer-usable storage mediums (including but not limited to a disk storage and an optical storage, etc.) having a computer-usable program code stored thereon.

The present application is described with reference to flowcharts and/or block diagrams of methods, devices (systems), and computer program products according to the embodiments of the present application. It should be understood that each procedure and/or block in the flowchart and/or block diagrams, and combinations of procedures and/or blocks in the flowchart and/or block diagrams can be implemented by the computer-executable instruction. These computer-executable instructions may be provided to a processor of a general-purpose computer, a specialized computer, an embedded processor, or other programmable data processor to produce a machine, and an apparatus for implementing a function specified in one or more processes of the flowchart and/or one or more blocks of the block diagram may be produced via the instructions executed by the processor of the computer or other programmable data processor.

These processor-executable instructions may also be stored in a processor-readable memory capable of directing a computer or other programmable data processors to operate in a specific manner, and the instructions stored in the processor-readable memory produce a manufacturing product including an instruction apparatus, where the instruction apparatus realizes the function specified in one or more procedures of the flow chart and/or one or more blocks of the block diagram.

These processor-executable instructions may also be loaded onto a computer or other programmable data processing device, and a series of operational steps may be performed on the computer or other programmable device to produce computer-implemented processing. Therefore, the instructions executed on the computer or other programmable device provide steps for implementing the functions specified in one or more processes of the flowchart and/or one or more blocks of the block diagram.

The invention claimed is:

1. A method for floor control of an intra-group point-to-multipoint communication service, applied to a service center, comprising:
   receiving a group call request sent by a first group terminal device in a target group, wherein the group call request comprises identification information of the target group;
   determining, according to the identification information of the target group and a mapping relationship established in advance between identification information of each group and identification information of a terminal device with a control right, the terminal device with the control right corresponding to the target group;
   sending identification information of the terminal device with the control right to other group terminal devices in the target group, to make the other group terminal devices request floor from the terminal device with the control right;
   sending the identification information of the target group and a control right role indication to the terminal device with the control right, to make the terminal device with the control right perform a floor control operation on a group terminal device in the corresponding target group;
   wherein the terminal device with the control right corresponding to the target group is a third group terminal device in the target group;
   the sending the identification information of the terminal device with the control right to the other group terminal devices in the target group, to make the other group terminal devices request the floor from the terminal device with the control right comprises:
   sending a group call request to a second group terminal device in the target group except the third group terminal device, wherein the group call request comprises identification information of the third group terminal device, to make the second group terminal device other than the third group terminal device request the floor from the third group terminal device, wherein the second group terminal device is a terminal device in the target group other than the first group terminal device;
   sending a group call response to the first group terminal device, wherein the group call response comprises the identification information of the third group terminal device, to make the first group terminal device request the floor from the third group terminal device;
   the sending the identification information of the target group and the control right role indication to the terminal device with the control right, to make the terminal device with the control right perform the floor control operation on the group terminal device in the corresponding target group comprises:
   sending a group call request to the third group terminal device, wherein the group call request comprises the identification information of the target group and the control right role indication, to make the third group terminal device perform the floor control operation on the group terminal device in the corresponding target group.

2. The method according to claim 1, wherein before the determining, according to the identification information of the target group and the mapping relationship established in advance between the identification information of each group and the identification information of the terminal device with the control right, the terminal device with the control right corresponding to the target group, the method further comprises:

setting, according to a service policy, a terminal device with the control right for each group;

establishing the mapping relationship between the identification information of each group and the identification information of the corresponding terminal device with the control right.

3. The method according to claim 1, wherein after the sending the control right role indication to the terminal device with the control right, to make the terminal device with the control right perform the floor control operation, the method further comprises:

acquiring an identification information list of a group terminal device currently having the floor;

sending the identification information of the target group and the identification information list of the group terminal device currently having the floor to a session management function network element (SMF), to make the SMF determine a current multicast data forwarding policy corresponding to each group terminal device in the target group according to the identification information of the target group and the identification information list of the group terminal device currently having the floor, and sending the current multicast data forwarding policy to a user plane function network element (UPF) corresponding to the group terminal device;

wherein the acquiring the identification information list of the group terminal device currently having the floor comprises:

receiving the identification information list of the group terminal device currently having the floor sent by the terminal device with the control right.

4. An apparatus for floor control of an intra-group point-to-multipoint communication service, located in a service center, comprising a memory, a transceiver, and a processor:

wherein the memory is configured to store a computer program; the transceiver is configured to send and receive data under control of the processor; and the processor is configured to read the computer program in the memory and execute the method according to claim 1;

wherein the terminal device with the control right corresponding to the target group is a terminal device outside the target group;

when the processor is configured to send the identification information of the terminal device with the control right to the other group terminal devices in the target group, to make the other group terminal devices request the floor from the terminal device with the control right, the operations comprise:

sending a group call request to a second group terminal device in the target group, wherein the group call request comprises identification information of the terminal device outside the target group, to make the second group terminal device request the floor from the terminal device outside the target group, wherein the second group terminal device is a terminal device in the target group other than the first group terminal device;

sending a group call response to the first group terminal device, wherein the group call response comprises the identification information of the terminal device outside the target group, to make the first group terminal device request the floor from the terminal device outside the target group;

when the processor is configured to send the identification information of the target group and the control right role indication to the terminal device with the control right, to make the terminal device with the control right perform the floor control operation on the group terminal device in the corresponding target group, the operations specifically comprise:

sending a floor notification message to the terminal device outside the target group, wherein the floor notification message comprises the identification information of the target group and the control right role indication, to make the terminal device outside the target group perform the floor control operation on the group terminal device in the corresponding target group.

5. The apparatus according to claim 4, wherein before the processor is configured to determine, according to the identification information of the target group and the mapping relationship established in advance between the identification information of each group and the identification information of the terminal device with the control right, the terminal device with the control right corresponding to the target group, the operations further comprise:

setting, according to a service policy, a terminal device with the control right for each group;

establishing the mapping relationship between the identification information of each group and the identification information of the corresponding terminal device with the control right.

6. The apparatus according to claim 4, wherein after the processor is configured to send the control right role indication to the terminal device with the control right, to make the terminal device with the control right perform the floor control operation, the operations further comprise:

acquiring an identification information list of a group terminal device currently having the floor;

sending the identification information of the target group and the identification information list of the group terminal device currently having the floor to a session management function network element SMF, to make the SMF determine a current multicast data forwarding policy corresponding to each group terminal device in the target group according to the identification information of the target group and the identification information list of the group terminal device currently having the floor, and sending the current multicast data forwarding policy to a user plane function network element UPF corresponding to the group terminal device;

wherein when the processor is configured to acquire the identification information list of the group terminal device currently having the floor, the operations comprise:

receiving the identification information list of the group terminal device currently having the floor sent by the terminal device with the control right.

7. A non-transitory processor-readable storage medium, wherein the processor-readable storage medium has a computer program stored thereon, and the computer program is used to cause the processor to execute the method according to claim 1.

* * * * *